United States Patent
Rothman

(10) Patent No.: US 11,446,678 B2
(45) Date of Patent: Sep. 20, 2022

(54) MINERAL PROCESSING PLANT

(71) Applicant: CiDRA Corporate Services LLC, Wallingford, CT (US)

(72) Inventor: Paul J. Rothman, Windsor, CT (US)

(73) Assignee: CiDRA Corporate Services LLC, Wallingford, CT (US)

( * ) Notice: Subject to any disclaimer, the term of this patent is extended or adjusted under 35 U.S.C. 154(b) by 315 days.

(21) Appl. No.: 16/555,478

(22) PCT Filed: Mar. 1, 2018

(86) PCT No.: PCT/US2018/020423
§ 371 (c)(1),
(2) Date: Aug. 29, 2019

(87) PCT Pub. No.: WO2018/160817
PCT Pub. Date: Sep. 7, 2018

(65) Prior Publication Data
US 2020/0078795 A1    Mar. 12, 2020

Related U.S. Application Data

(60) Provisional application No. 62/465,231, filed on Mar. 1, 2017.

(51) Int. Cl.
*B03B 1/04*       (2006.01)
*B03B 5/30*       (2006.01)
(Continued)

(52) U.S. Cl.
CPC .................. *B03B 1/04* (2013.01); *B03B 5/30* (2013.01); *B03B 7/00* (2013.01); *B03C 1/30* (2013.01);
(Continued)

(58) Field of Classification Search
CPC .... B03B 1/04; B03B 5/28; B03B 5/30; B03B 7/00; B03C 1/30; B03C 2201/18; B03C 2201/20
See application file for complete search history.

(56) References Cited

U.S. PATENT DOCUMENTS 9,302,270 B2      4/2016  Rothman et al.
11,097,205 B2 *   8/2021  Ryan ..................... B01D 11/04
(Continued)

FOREIGN PATENT DOCUMENTS

WO          02066168 A1    8/2002
WO        2018160648 A1    9/2018
(Continued)

*Primary Examiner* — Michael McCullough
*Assistant Examiner* — Kalyanavenkateshware Kumar
(74) *Attorney, Agent, or Firm* — Ware, Fressola, Maguire & Barber LLP

(57) ABSTRACT

A modified selective recirculation circuit has a loading stage, a stripping stage and a filtering stage for use in processing a feed stream or slurry containing mineral particles. The stripping stage forms a first loop with the loading stage, a second loop with the filtering stage. The loading stage has a loading mixer and a loading washing screen. The stripping stage has a stripping mixer and a stripping washing screen. The loading mixer receives the slurry and causes barren media in the circuit to contact with the slurry so that the mineral particles in the slurry are loaded onto the barren media. The media is directed to the stripping stage where the mineral particles are removed from the media. The barren media is recycled to the loading stage. The stripping solution recovered from the filtering stage is returned to the stripping stage and the mineral particles are discharged as concentrate.

25 Claims, 23 Drawing Sheets

(51) Int. Cl.
*B03B 7/00* (2006.01)
*B03C 1/30* (2006.01)
*B03D 1/02* (2006.01)
*C22B 3/22* (2006.01)
*C22B 15/00* (2006.01)

(52) U.S. Cl.
CPC ............ *B03D 1/023* (2013.01); *C22B 3/22* (2013.01); *C22B 15/0084* (2013.01); *B03C 2201/18* (2013.01); *B03C 2201/20* (2013.01)

(56) References Cited

U.S. PATENT DOCUMENTS

| | | |
|---|---|---|
| 2010/0072110 A1 | 3/2010 | Gradek |
| 2010/0200510 A1 | 8/2010 | Domke et al. |
| 2013/0331632 A1 | 12/2013 | Drake |
| 2015/0209799 A1 | 7/2015 | Rothman et al. |
| 2017/0232451 A1* | 8/2017 | Rothman ............... B03D 1/016 209/163 |

FOREIGN PATENT DOCUMENTS

| | | |
|---|---|---|
| WO | 2018160793 A1 | 9/2018 |
| WO | 2018160806 A1 | 9/2018 |

* cited by examiner

MINERAL PROCESSING PLANT

CROSS-REFERENCE TO RELATED APPLICATIONS

This application claims benefit to provisional patent application Ser. No. 62/465,231, filed 1 Mar. 2017, entitled "Conventional mineral processing plant", which is hereby incorporated by reference in its entirety.

This application is related to PCT application No. PCT/US16/57322, filed 17 Oct. 2016, entitled "Mineral beneficiation utilizing engineered materials for mineral separation and coarse particle recovery", which claims benefit to U.S. provisional application Ser. No. 62/242,545, filed 16 Oct. 2015, entitled "Mineral beneficiation utilizing engineered materials for mineral separation and coarse particle recovery", which are hereby incorporated by reference in their entirety.

The application is related to PCT application No. PCT/US17/55072, filed 4 Oct. 2017, entitled "Separation of copper and molybdenum sulfides from pyrite using a sea water/desalinated water hybrid process", which claims benefit to U.S. provisional application No. 62/403,837 of the same title, filed 4 Oct. 2016, which are hereby incorporated by reference in their entirety.

This application is also related to a family of nine PCT applications, which were all concurrently filed on 25 May 2012, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest," which corresponds to U.S. Pat. No. 9,352,335;

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/037823, filed 13 May 2014, entitled "Polymer surfaces having a siloxane functional group," which claims benefit to U.S. Provisional Patent Application No. 61/822,679, filed 13 May 2013, as well as U.S. patent application Ser. No. 14/118,984, filed 27 Jan. 2014, and is a continuation-in-part to PCT application no. PCT/US12/39631, filed 25 May 2012, which are all hereby incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

BACKGROUND OF THE INVENTION

Technical Field

This invention relates generally to a method and apparatus for processing comminution product into concentrate.

Description of Related Art

A conventional mineral process plant for base metals porphyry type deposits (i.e. copper sulfide beneficiation) consists of multiple stages of comminution and froth flotation. The comminution stages are required to break the host or matrix rock to expose the crystals or grains of sulfide minerals. This process requires very large amounts of energy—typically 50% or more of the total energy required to produce base metals from their ores. The finer the mineralization of the minerals, the finer the required grind size and therefore the higher the energy requirements. It is recognized that the incremental energy required for given size reduction increases exponentially with size of the particle.

It is also recognized that different kinds of comminution equipment are more efficient than others, depending on the hardness of the ore and range of particle size reduction. For very large particles, such as run-of-mine ore, gyratory crushers are the most efficient. For hard or dry intermediate particles, such as gravels and aggregates, cone crushers and high pressure grinding rolls crushers are more efficient. For wet or soft intermediate particles, semi-autogenous grinding (SAG) or fully-autogenous grinding (AG) mills are more efficient. For finer grinding applications, horizontal ball mills are the equipment of choice. For very fine or ultra-fine grinding, vertical mills, media detritors, Isamills®, and other specially design equipment are the most energy-efficient. All of the above comminution innovations were developed to minimize the power required to achieve a given product particle size assuming some fixed feed particle size.

An alternative method of reducing the power requirement is to increase the product particle size and therefore reduce the amount of comminution work that must be performed. This approach is problematic because it often compromises the recovery in the downstream froth flotation process due to the reduction in liberated surfaces of hydrophobic minerals. For this reason, mineral processing plants try to operate at an economic optimum grind size (particle size), defined as that point at which any incremental recovery benefit for grinding finer is equal to the incremental cost of energy and grinding media required to achieve that grind.

There are many alternative configurations of comminution and flotation circuits. FIG. 1 shows one such configuration, comprised of the following process equipment:

1. A primary crusher, usually a gyratory crusher or a jaw crusher.
2. A screen to remove the coarse particles from the primary crusher product and send them to the secondary crushers.
3. Secondary crushers, often shorthead or cone crushers (a kind of gyratory crusher specially designed for intermediate sized particles).
4. Tertiary crushers, which can be either gyratory or high pressure grinding rolls crushers.
5. Another screen, to treat the tertiary crusher product and to return any oversized or uncrushed particles to the tertiary crusher. The average screen opening can be between 4 mm and 12 mm, but is usually around 5 mm.
6. One or more ball mills that are in closed circuit with a classifier. The classifier—most often a cyclone—removes the coarse, unfinished product and returns it to the ball mill while permitting the finished, fine particles to advance to the flotation stage.
7. A rougher or rougher-scavenger flotation stage, in which the ground ore is upgraded via one or more froth flotation units.
8. A regrinding stage, to further grind the concentrates of the rougher flotation step.
9. A series of cleaning stages, which can be anywhere from one to ten individual stages depending on the equipment size, configuration and ore properties.
10. Thickeners, to remove excess water from various process streams. The most important stream for the purpose of water recovery is the plant tails, as this contains the bulk of the water that was input to the process. The tailings thickeners can be very large depending on the grind size, ore properties, and desired water recovery.
11. A filtration stage, to remove excess water from the thickened concentrate (so that the concentrate can be safely shipped).

The above flowsheet, and all current state-of-the-art sulfide beneficiation flowsheets, suffer from several drawbacks, namely:

1. The grinding process is extremely energy intensive and is responsible for a large percentage of the total cost of production.
2. Because flotation occurs most efficiently at lower percent solids than that of grinding, water is required to enable the flotation. This water must then be removed via the thickeners. A more efficient separation process would be one that could occur at the higher % solids that are optimum for grinding mills.

There is a need in the mining industry to provide a better way to process the comminution product.

SUMMARY OF THE INVENTION

The present invention offers a solution to the above limitations of traditional sulfide mineral beneficiation. The nature of the solution stems from the unique ability of the invented process to:

1. Offer a higher sulfide mineral recovery rate for a given liberation percentage, because, unlike froth flotation, it does not allow particle detachment after capture
2. Operate without the need for air, and hence without the need to achieve an air-water separation.
3. Operate at higher pulp percent solids, which allow for reduced water requirements than traditional froth flotation methods.

The above qualities allow for a significant reduction in capital cost, operating cost, water requirements, and energy requirements when the invented process is used for sulfide mineral beneficiation. FIG. 2 shows a possible configuration of the invented circuit herein referred to as a selective recirculation circuit. It consists of two co-current circulating loops of media and stripping solution. The barren media is contacted with the feed stream (slurry and unrecovered sulfide mineral particles), where the sulfide minerals are loaded on the media. The media is separated from the slurry on a vibrating screen equipped with wash water sprays ("washing screen"). The loaded media is then contacted with a stripping stage, which removes the sulfide particles from the media. The barren media is then recovered and returned to the loading stage. The strip solution is recovered in a filter and returned to the stripping stage. The mineral particles are recovered in a concentrate stream.

The selective recirculation circuit can be modified by incorporating a processing module to become a modified selective recirculation circuit to be used in a sulfide beneficiation process as shown in FIGS. 6, 7 and 8. This process has the same primary, secondary and tertiary crushing configuration as the traditional beneficiation flowsheet shown in FIG. 1 but there are numerous unique features about the grinding and flotation steps. They are:

1. There is a classification step before the ball mills, consisting of a desliming classifier, most likely a hydrocyclone operating at a d50 cut size of around 300 to 500 microns, in order to remove most of the fine particles from the ball mill feed. This material—perhaps around 20% to 30% of the total mass flow through the process, is optionally directed to a flash flotation device (i.e. a Contact Cell or similar pneumatic flotation device) to recover hydrophobic sulfide particles. The flotation tails are then thickened to recover process water and return it to screen. The concentrates are direct, optionally, to one of the downstream regrinding steps (depending on the particle size of that stream).
2. The ball mills are no longer operated in closed circuit with hydrocyclones; they are now operated in open circuit. This eliminates the high circulating loads (100% to 500% of the fresh feed is recirculated to the mill) that characterize normal ball mill operations, and allows for a reduction of between 65% and 80% of size of the ball milling circuit depending on the cut size selected for the pre-classification step.
3. The ball mill product is classified with either a screen or a hydrocyclone operating at a D50 cut size of around 1 mm. The coarse particles are then directed to a modified selective recirculation circuit. Any recovered coarse particles are returned to the grinding mills, while the unrecovered particles are directed to tails. This is significantly different from the traditional configuration, in which all of the coarse material is returned to the ball mill. Because the modified selective recirculation circuit is optimized for coarse particle recovery (because there is very little detachment), only those particles with some exposed hydrophobic faces are recycled to the ball mill, greatly reducing the amount of work that must be done in that comminution step. For the remainder of this document, this concept has been termed "selective recirculation".
4. The classifier fines—now only 15% to 50% of the original feed but containing perhaps 80% to 95% of the sulfide minerals in the original feed—are then directed to a secondary grinding step, consisting of vertical mills. Vertical mills are up to 35% more efficient than ball mills for processing fine particles (less than 1 mm); hence, they are a better choice for this fine grinding application. Like the previous grinding step, the vertical mills are configured with a product classifier and modified selective recirculation circuit operating in modified selective recirculation configuration. This allows for the rejection of between 70% and 99% of the remaining material while recovering almost all of the reground sulfide minerals.

5. The vertical mill circuit product is again treated in a flash flotation device—a contact cell or other pneumatic flotation cell—to remove the fastest, highest-grade particles. The tails are then combined with the tails of the first contact cell and directed to a third modified selective recirculation circuit scavenging any remaining sulfide particles.

6. The recovered sulfide particles from the "Scavenger" selective recirculation circuit are combined with the concentrates of the Contact Cells and directed to a third and final grinding step, termed the "Polishing Mills". These mills are operating at very fine grinds—typically 30 to 75 microns—and therefore IsaMills or Stirred Media Detritors (SMD) would be more appropriate for this size range. The final product—containing between 1% and 5% of the original plant feed but perhaps 80% to 95% of the desirable sulfide minerals—is then floated a third and final time, then directed to a "Cleaner" selective recirculation circuit. The tails of this selective recirculation circuit is recycled to a prior step (Intermediate flotation in the diagram shown).

In an embodiment, the present invention provides a method and apparatus for collecting mineral particles in a feed stream containing slurry and mineral particles, the method and apparatus comprising three stages: a loading stage, a stripping stage and a filtering stage. In the loading stage, the mineral particles in the received feed stream are loaded on barren media to provide loaded media. In the stripping stage, the loaded media is stripped with a stripping solution for separating the mineral particles from the barren media, wherein the barren media is returned to the loading stage for further use and the mineral particles along with the stripping solution are directed to the filtering stage where the stripping solution is recycled back the stripping stage and the mineral particles are directed to concentrates. In the feed stream where the mineral particles comprise recovered particles having exposed hydrophobic faces and unrecovered particles, the loaded media comprises the recovered particles and the unrecovered particles may be discharged along the slurry from the loading stage.

In an embodiment of the present invention, the stripping stage forms a first loop with the loading stage and forms a second loop with the filtering stage. As such, the stripping stage is configured to provide barren media to the loading stage and to receive loaded media from the loading stage via the first loop, while the stripping stage is configured to receive the stripping solution from the filtering stage and to provide the recovered particles to the filtering stage via the second loop.

Thus, a first aspect of the present invention is an apparatus having a first end and an opposing second end, the apparatus comprising:

a plurality of polymer-coated media having hydrophobic surfaces to attract mineral particles in a slurry, the slurry containing unwanted materials;

a loading compartment configured to receive the polymer-coated media and the slurry from the first end and to load the polymer-coated media with the mineral particles for providing loaded media; and a separation compartment configured to receive the loaded media from the loading compartment, and to separate the loaded media from the unwanted materials in the slurry, the separation compartment comprising a first output and a second output on the second end, the first output configured to discharge the loaded media and the second output configured to discharge the unwanted materials.

According to an embodiment of the present invention, the separation compartment configured to separate the loaded media from the unwanted materials in the slurry in the presence of a static force, and wherein the polymer-coated media comprise a physical property responsive to the static force.

According to an embodiment of the present invention, the static force comprises a magnetic field, and the polymer-coated media comprise a plurality of synthetic beads, each of the synthetic beads having a core containing a magnetic material responsive to the magnetic field, the apparatus further comprising:

a magnetic source located in relationship to the separation compartment configured to generate the magnetic field so as to direct the loaded media to the first output.

According to an embodiment of the present invention, the static force comprises a gravitational force and the polymer-coated media comprise a plurality of synthetic beads, each of the synthetic beads having a bead density greater than a density of the slurry so as to allow the loaded media to sink in the separation compartment and to move toward the first output.

According to an embodiment of the present invention, the polymer-coated media comprise a plurality of synthetic beads, each of the synthetic beads having a bead size larger than the unwanted materials, the apparatus further comprising:

a screen located in the separation compartment configured to separate the loaded media and the unwanted materials.

According to an embodiment of the present invention, the static force comprises a buoyant force and the polymer-coated media comprise a plurality of synthetic beads, each of the synthetic beads having a bead density smaller than a density of the slurry so as to allow the loaded media to float in the separation compartment and to move toward the first output.

According to an embodiment of the present invention, the apparatus further comprising:

a further magnetic source located near the loading compartment configured to stir the polymer-coated media so as to enhance loading of the polymer-coated media with the mineral particles.

According to an embodiment of the present invention, the loading compartment comprises an input to receive the polymer-coated media and the slurry, the slurry configured to form a flow from the input of the loading compartment to the separation compartment, the apparatus further comprising:

venturis or an orifice plate located in the loading compartment configured to disturb the flow in the loading compartment so as to enhance loading of the polymer-coated media with the mineral particles.

According to an embodiment of the present invention, the loading compartment comprises an input to receive the polymer-coated media and the slurry, the slurry configured to form a flow from the input of the loading compartment to the separation compartment, the apparatus further comprising:

continuous loops configured to extend a path of the flow from the loading compartment to the separation compartment so as to enhance loading of the polymer-coated media with the mineral particles.

According to an embodiment of the present invention, the loading compartment comprises an input to receive the polymer-coated media and the slurry, the slurry configured to form a flow from the input of the loading compartment to the separation compartment, the apparatus further comprising:

a connected pipe manifold configured to extend a path of the flow from the loading compartment to the separation compartment so as to enhance loading of the polymer-coated media with the mineral particles.

According to an embodiment of the present invention, the apparatus further comprising:

a stripping stage configured to receive the loaded media from the first output and to strip the loaded media with a stripping solution into a first portion comprising the polymer-coated media and a second portion containing the mineral particles and the stripping solution; and a filtering stage configured to separate the mineral particles from the stripping solution in the second portion.

According to an embodiment of the present invention, the polymer-coated media comprise a plurality of synthetic beads, each of the synthetic beads having a surface having a hydrophobic chemical selected from the group consisting of poly(dimethysiloxane), hydrophobically-modified ethyl hydroxyethyl cellulose polysiloxanes, alkylsilane and fluoroalkylsilane.

According to an embodiment of the present invention, the surface of the synthetic bubbles and beads comprises a coating made of one or more dimethyl siloxane, dimethyl-terminated polydimethylsiloxane and dimethyl methylhydrogen siloxane.

The second aspect of the present invention is a mineral processor, comprising a processing module having a first end and a second end, the processing module comprising a loading compartment and a separation compartment, wherein the loading compartment is configured to receive polymer-coated media and a slurry from the first end and to load the polymer-coated media with the mineral particles for providing loaded media; and the separation compartment is configured to receive the loaded media from the loading compartment, and to separate the loaded media from the unwanted materials in the slurry, the separation compartment comprising a first output and a second output on the second end, the first output configured to discharge the loaded media and the second output configured to discharge the unwanted materials;

a stripping stage configured to receive the loaded media from the first output and to strip the loaded media with a stripping solution into a first portion comprising the polymer-coated media and a second portion containing the mineral particles and the stripping solution; and a filtering stage configured to separate the mineral particles from the stripping solution in the second portion.

According to an embodiment of the present invention, the separation compartment configured to separate the loaded media from the unwanted materials in the slurry in the presence of a static force, and wherein the polymer-coated media comprise a physical property responsive to the static force.

According to an embodiment of the present invention, the static force comprises a magnetic field, and the polymer-coated media comprise a plurality of synthetic beads, each of the synthetic beads having a core containing a magnetic material responsive to the magnetic field, the apparatus further comprising:

a magnetic source located in relationship to the separation compartment configured to generate the magnetic field so as to direct the loaded media to the first output.

According to an embodiment of the present invention, the static force comprises a gravitational force and the polymer-coated media comprise a plurality of synthetic beads, each of the synthetic beads having a bead density greater than a density of the slurry so as to allow the loaded media to sink in the separation compartment and to move toward the first output.

According to an embodiment of the present invention, the loading compartment comprises an input to receive the polymer-coated media and the slurry, the slurry configured to form a flow from the input of the loading compartment to the separation compartment, the apparatus further comprising:

venturis or an orifice plate located in the loading compartment configured to disturb the flow in the loading compartment so as to enhance loading of the polymer-coated media with the mineral particles.

According to an embodiment of the present invention, the stripping stage is arranged to form a first loop with the loading compartment, and to form a second loop with the filtering stage.

According to an embodiment of the present invention, the stripping stage configured to provide the first portion containing the polymer-coated media to the loading compartment and to receive the loaded media via the first loop; and to provide the second portion to the filtering stage and to receive the stripping solution from the filtering stage via the second loop.

According to an embodiment of the present invention, the filtering stage is configured to output concentrates containing the mineral particles.

According to an embodiment of the present invention, the mineral particles comprise recovered particles having exposed hydrophobic surfaces and unrecovered particles, and wherein the loading stage comprises a mixing stage and a screening stage, the mixing stage configured to load the barren media with the recovered particles and the screening stage configured to discharge the unrecovered particles from the loading stage.

According to an embodiment of the present invention, the loading stage comprises a media loading stage and a loaded media recovery stage, the media loading stage configured to load the barren media with mineral particles, the loaded media recovery stage configured to separate the loaded media from the slurry.

According to an embodiment of the present invention, the stripping stage comprises a media stripping stage and a barren media recovery stage, the media stripping stage configured to strip the mineral particles from the loaded media, the barren media recovery stage configured to return the barren particles in the stripping stage to the media loading stage.

According to an embodiment of the present invention, the mineral particles comprise recovered particles and unrecovered particles, the loaded media containing the recovered particles, and wherein the media loading stage comprises an input arranged to receive the slurry and the loaded media recovery stage comprises a first output arranged to discharge the unrecovered particles, and wherein the filtering stage comprises a second output arranged to output the recovered particles.

According to an embodiment of the present invention, the processor further comprising a milling stage and a classifying stage, the milling stage configured to mill a first comminution product into a second comminution product, the classifying stage configured to separate coarser particles from finer particles in the second comminution product, and wherein the slurry comprises process water and the coarser particles containing the mineral particles, and wherein the input is arranged to receive the slurry from the classifying stage, and the second output is arranged to return the recovered particles to the milling stage.

According to an embodiment of the present invention, the finer particles in the second comminution product are directed to a further milling stage.

According to an embodiment of the present invention, the finer particles in the second comminution product are further regrinding in the further milling stage into a first reground product and a second reground product having coarse particles than the first reground product, wherein the first reground product is directed to flotation.

According to an embodiment of the present invention, the second reground product also comprises unrecovered particles to be discharged as tails.

According to an embodiment of the present invention, the input is arranged to receive the slurry from a flotation cell.

DETAILED DESCRIPTION OF THE INVENTION

Figure 1:
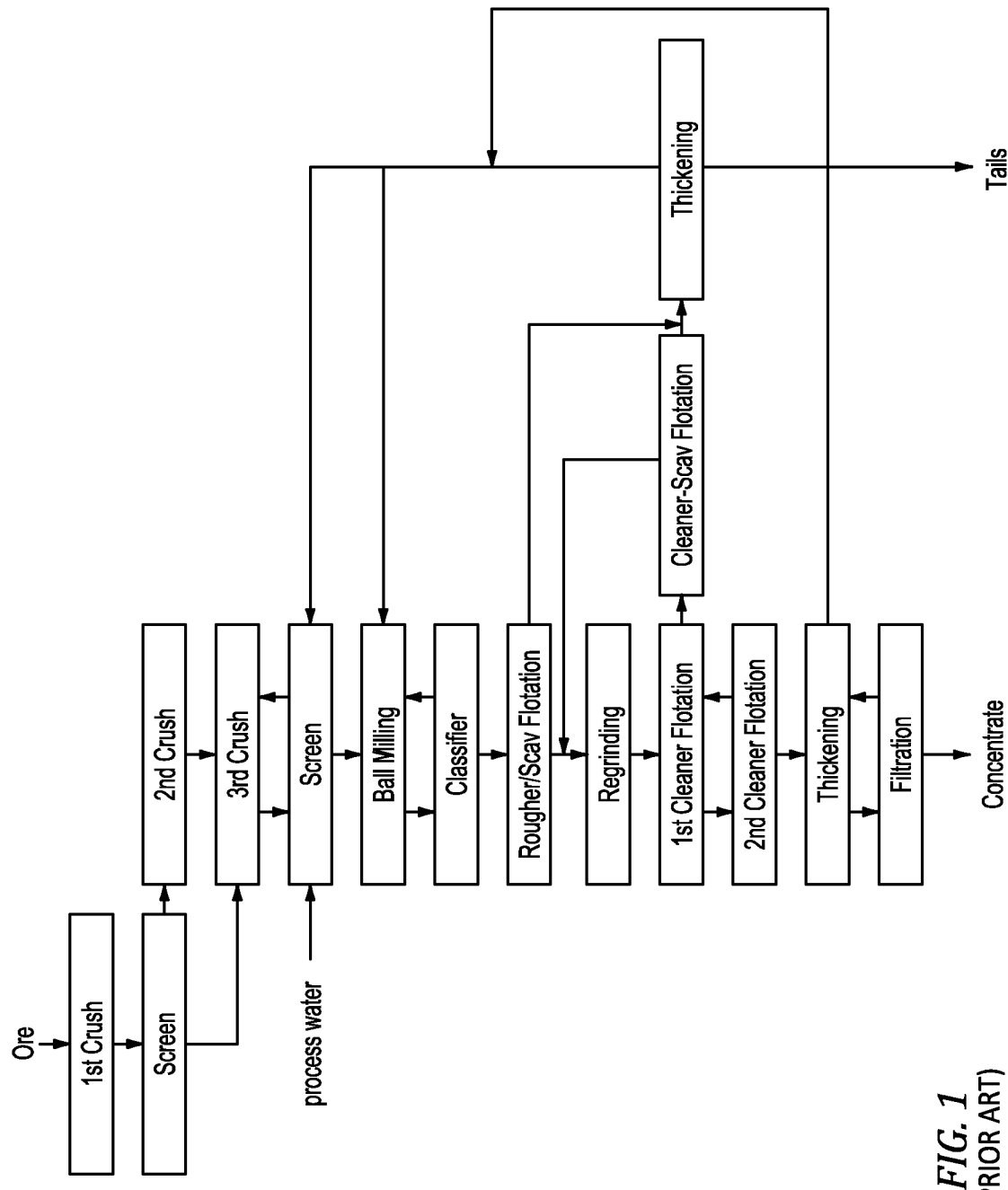
FIG. 1 is a flowsheet depicting a prior art process for sulfide beneficiation.
Figure 2:
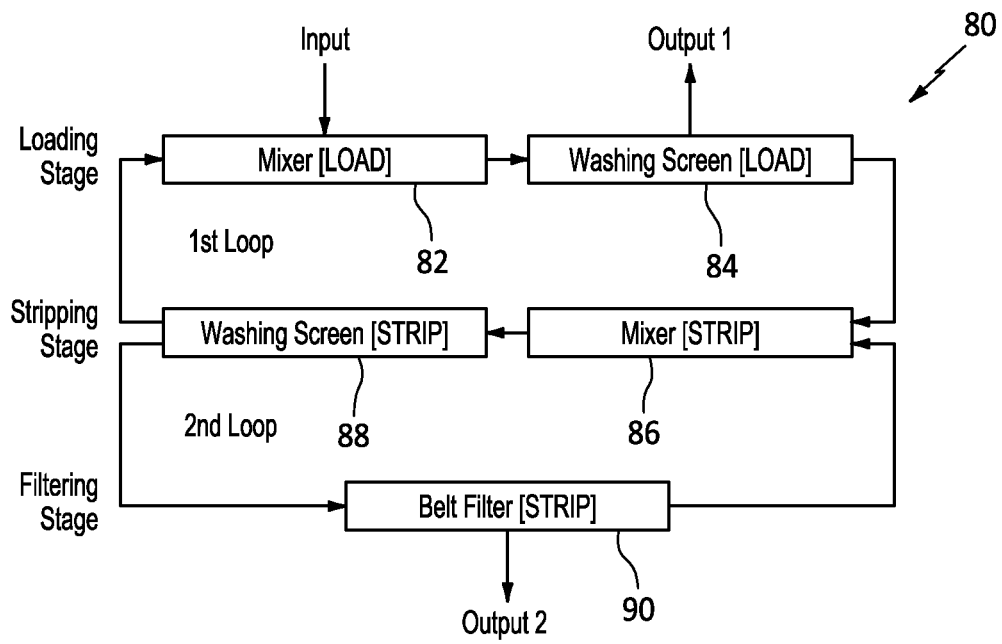
FIG. 2 illustrates a selective recirculation circuit, according to an embodiment of the present invention.
Figure 2A:
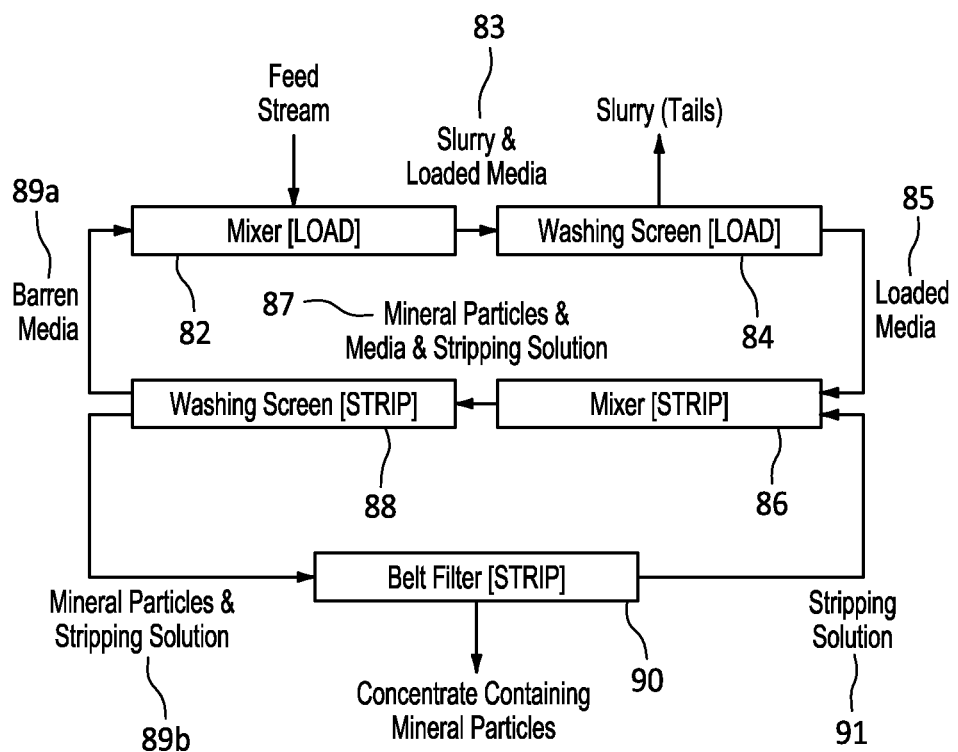
FIG. 2a illustrates an application of the selective recirculation circuit, according to an embodiment of the present invention.
Figure 3:
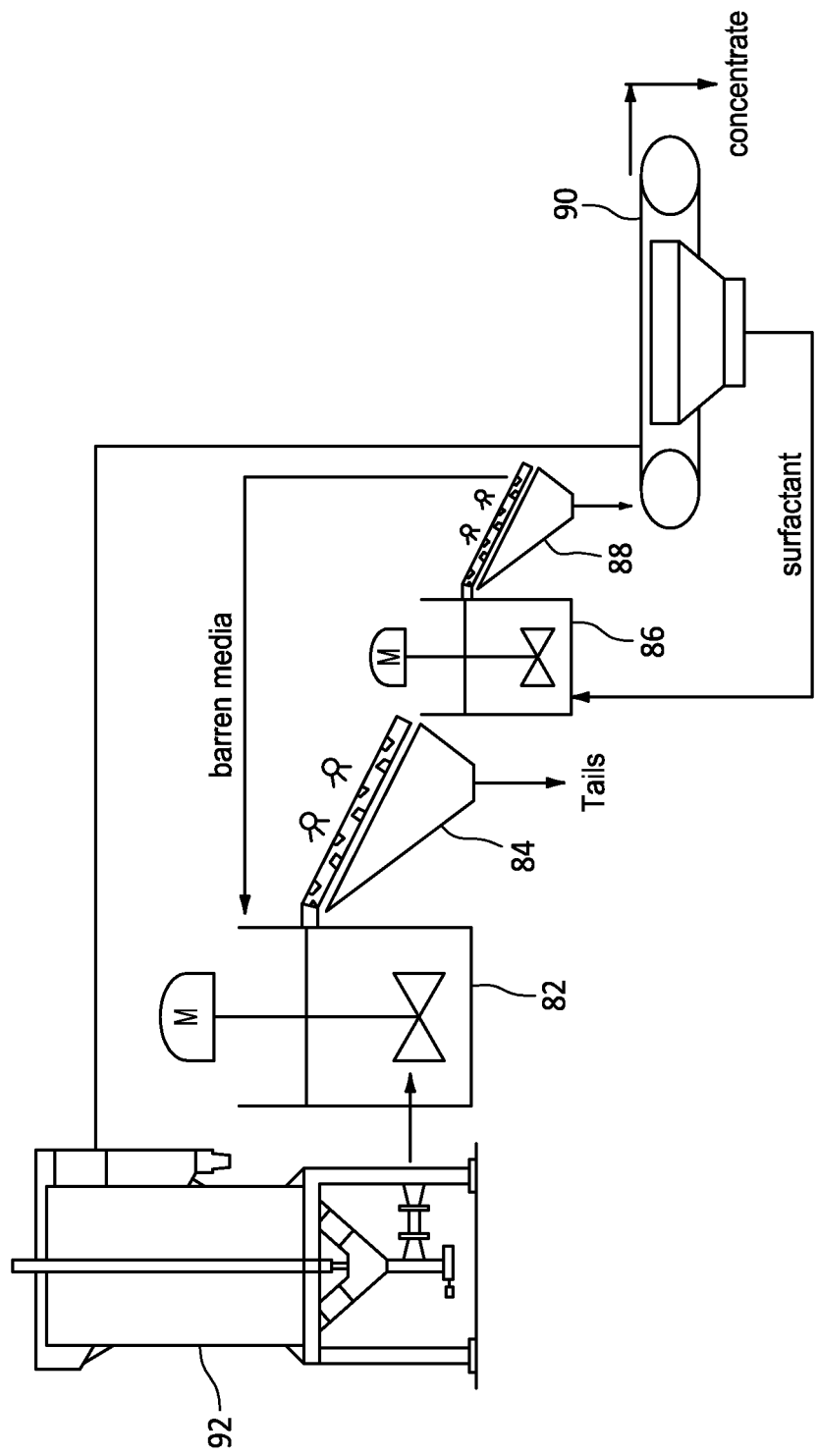
FIG. 3 illustrates an application of the selective recirculation circuit, according to an embodiment of the present invention.

FIGS. 2, 2a and 3

By way of example, FIG. 2 shows the present invention in the form of block diagrams presenting various stages in a selective recirculation circuit 80, according to an embodiment of the present invention. The selective recirculation circuit 80 consists of two co-current circulating loops of media and stripping solution. The circuit 80 comprises a loading stage, a stripping stage and a filtering stage. The stripping stage is configured to form a first loop with the loading stage and a second loop with the filtering stage. The loading stage comprises a mixer 82 and a washing screen 84, and the stripping stage comprises a mixer 86 and a washing screen 88. The stripping stage is linked a filter 90 of the filtering stage. The selective recirculation 80 has an input provided to the mixer 82, an output 1 provided on the washing screen 84 and an output 2 provided on the filter 90.

The selective recirculation circuit 80 has many different uses. One of those uses is depicted in FIG. 3.

FIG. 3 shows the present invention in the form of apparatus comprising of two sets of mixer-separators, each of which is used as an agitation tank to a screen. As shown in FIG. 3, barren media is contacted with the feed stream (slurry and unrecovered sulfide mineral particles) from input 1, where the sulfide minerals are loaded on the media in the mixer 82, and the media is directed to the washing screen 44, where the media is separated from the slurry on a vibrating screen equipped with wash water sprays ("washing screen"). The loaded media is then contacted with the stripping stage, which removes the sulfide particles from the media. In the stripping stage, after the loaded media in the mixer 86 is stirred, it is directed to the washing screen 88, where the barren media is recovered and returned to the loading stage. The strip solution is recovered in the filter 90 and returned to the stripping stage. The mineral particles are recovered in a concentrate stream. In FIG. 3, the mixer 82 receives the feed form a flotation stage (contact cell) 92.

In the above disclosed application, the selective recirculation circuit 80 can be depicted in FIG. 2a, the input of the selective recirculation circuit 80 is arranged to receive the tails from a flotation stage 82 as feed of slurry and mineral particles. Output 1 is used to discharge the slurry as tails and the output 2 is used to output concentrates. As shown in FIG. 2a, the loading mixer 82 also receives barren media 89a from the stripping stage and causes the barren media to contact with slurry so that the mineral particles in the slurry are loaded on the barren media. The mixture 83 of slurry and loaded media are directed to the loading washing screen 84 where loaded media are separated from the slurry which is discharge as tails. The loaded media 85 is directed to stripping mixer 86 where mineral particles are stripped from the loaded media. The mixture 87 of mineral particles, the media and the stripping solution is directed to the stripping washing screen 88 where barren media 89a is returned to the loading stage, whereas the mineral particles and stripping solution in mixture 89b are separated by the filter 90. The stripping solution 91 is recycled to the stripping stage, while the mineral particles are discharged as concentrates.

Figure 4:
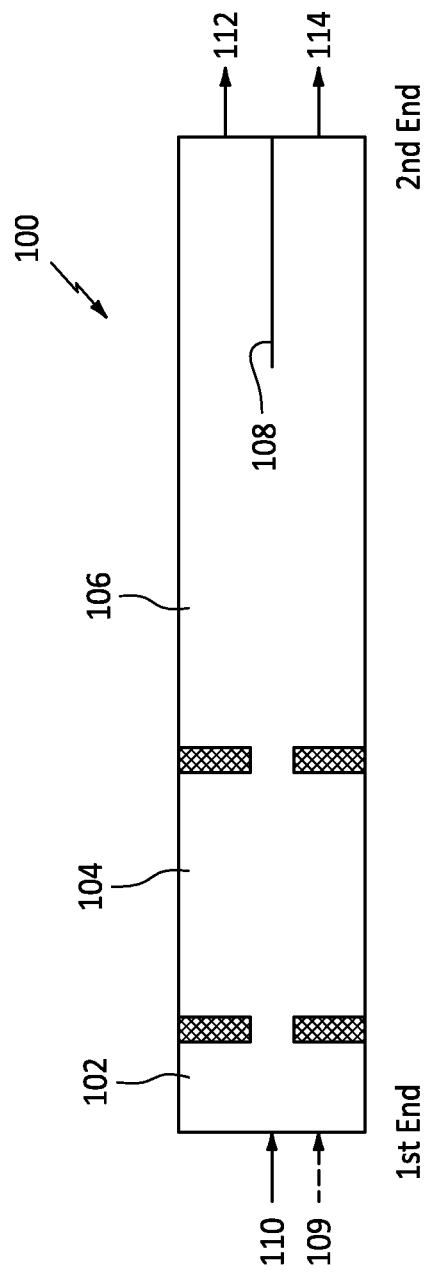
FIG. 4 illustrates a generalized processing module, according to an embodiment of the present invention.

As shown in FIG. 3, the apparatus has many moving parts. In particulars, it has two sets of mixer-separators which can be replaced by a processing module as shown in FIG. 4. For example, the loading mixer 82 and the loading washing screen 84 can be replaced by one processing module (see FIG. 4a). Furthermore, the stripping mixer 86 and the stripping washing screen 88 can also be replaced by another processing module (see FIG. 4b).

FIGS. 4, 4a, 4b and 5a-5e

FIG. 4 depicts a generalized processing module 100 according to an embodiment of the present invention. The process module 100 has no moving parts. The processing module 100 has three sections or compartments: a receiving compartment 102, a mixing/loading compartment 104 and a separation compartment 106. The separation section 106 has a separating barrier 108. The processing module 100 has a first end and an opposing second end. The second end has two outputs 112 and 114. The first end has an input 110 and an optional input 109. The processing module 100 can be used as a mineral concentration device as shown in FIGS. 15a-15f. In an embodiment of the present invention, the receiving compartment 102 is arranged to receive a slurry containing mineral particles and polymer-coated media having a hydrophobic surface to attract mineral particles. Both the slurry and the polymer-coated media can be received into the receiving compartment 102 through input 110. Alternatively, the slurry is received through the input 110 and the polymer-coated media (barren media) are received through the input 109. In the mixing/loading compartment 104, the mineral particles are caused to attach to the polymer-coated media to provide loaded media. In the separation compartment 106, the loaded media are separated from the tails. After passing through the separating barrier 108, the loaded media are discharged through output 114 and the tails are discharged through output 112. It should be noted that, the slurry usually contains ground ore and water. The slurry also contains unwanted materials such as soil particles from the ore. It should also be noted that not all the mineral particles in the slurry will be attracted on and become attached to the polymer-coated media and not all the polymer-coated media will become loaded media. Thus, although most of unwanted materials in the slurry will be discharged through output 112 as tails, the tails will contain some mineral particles that are not loaded onto the polymer-coated media. Likewise, the polymer-coated media discharged from output 114 are also likely containing "unloaded" media as well as loaded media.

Figure 4A:
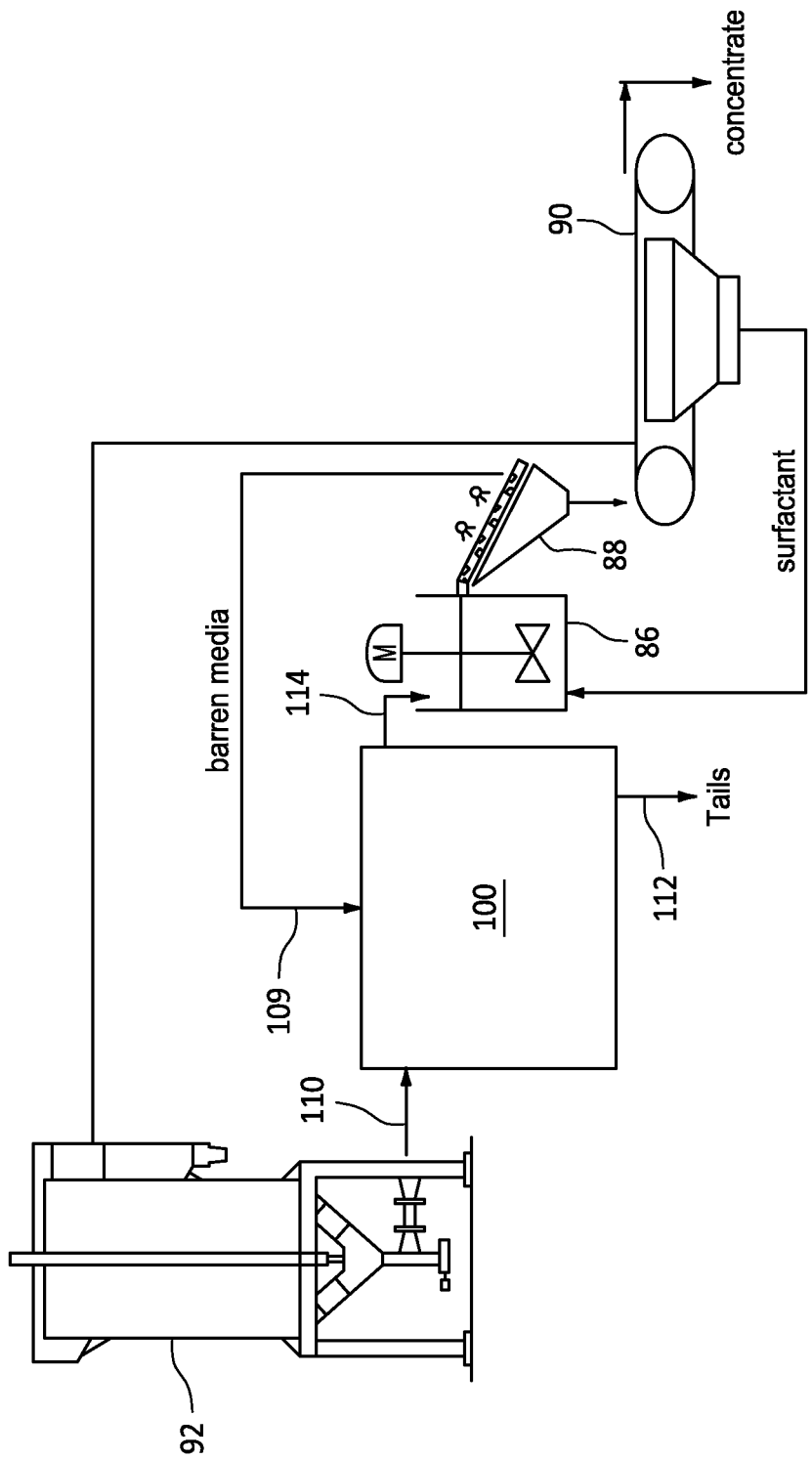
FIG. 4a illustrates an application of the selective recirculation circuit modified to incorporate the processing module, according to an embodiment of the present invention.

The processing module 100 can be used to replace the loading mixer 82 and the loading washing screen 84 of the selective recirculation circuit as shown in FIG. 2a and FIG. 3. The selective recirculation circuit which is modified by incorporating the processing module 100 is shown in FIGS. 5a -5d. The apparatus, as shown in FIG. 3, can be modified by incorporating the processing module 100 as shown in FIG. 4a. In FIG. 4a, the processing module 100 receives a feed stream from the flotation stage or contact cell 92 through input 110 and barren media (unloaded polymer-coated media) through input 109. The loaded media are fed to the stripping mixer 86 through output 114 and the tails are discharged through output 112.

Figure 4B:
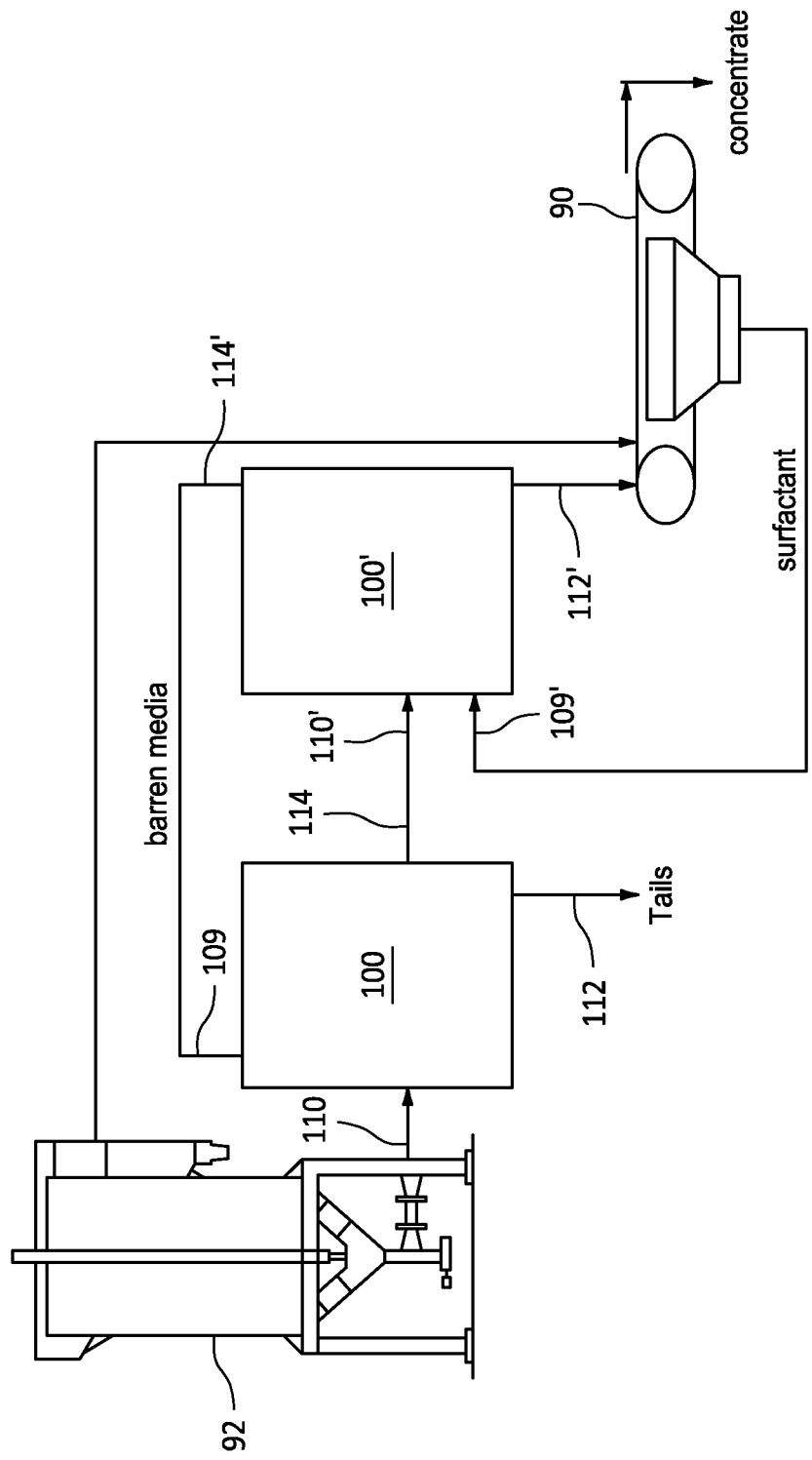
FIG. 4b illustrates an application of the selective recirculation circuit modified to incorporate two processing modules, according to an embodiment of the present invention.

The apparatus, as shown in FIG. 3, can be modified by incorporating two processing modules 100 as shown in FIG. 4b. In FIG. 4a, the processing module 100 receives a feed stream from the flotation stage or contact cell 92 through input 110 and barren media (unloaded polymer-coated media) through input 109. The tails are discharged through output 112. The loaded media the first processing module 100 are conveyed through output 114 to the input 110' of the second processing module 100'. After mixing and washing in the stripping process, the barren media are returned to the first processing module 100 through output 114', and the mineral particles along with stripping solution (surfactant) are discharged through output 112'. The second processing module 100' may also receive recycled surfactant through input 109'.

Figure 5A:
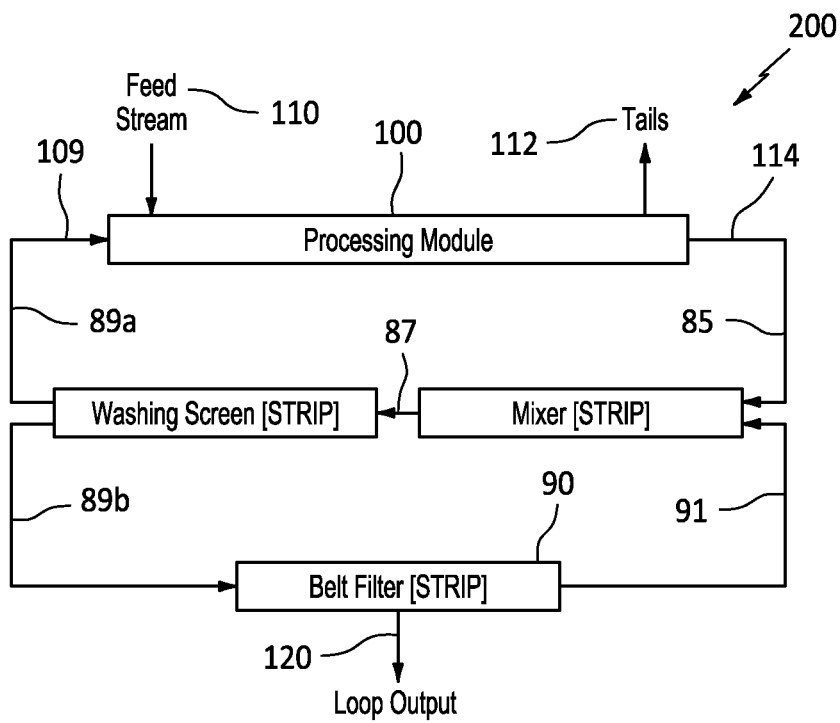
FIG. 5a illustrates a selective recirculation circuit modified to incorporate the processing module, according to an embodiment of the present invention.

In the modified selective recirculation circuit 200 as shown in FIG. 5a, the barren media 89a are returned to the processing module 100 through input 109 and loaded media 85 are fed to the stripping mixer 86 through output 114.

Figure 5B:
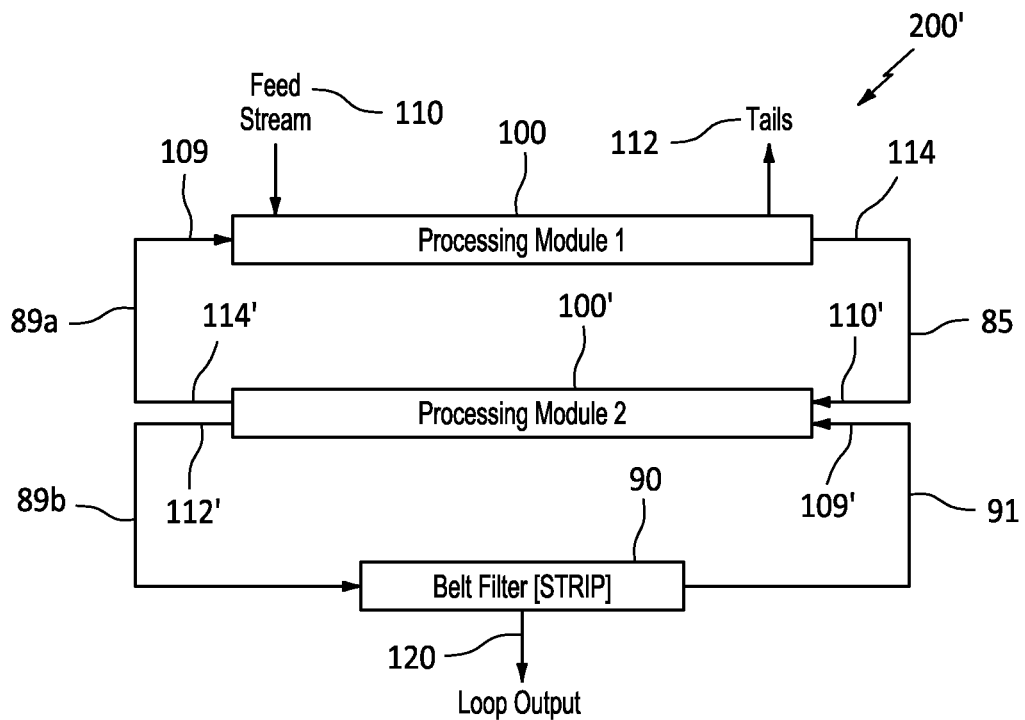
FIG. 5b illustrates a selective recirculation circuit modified to incorporate two processing modules, according to another embodiment of the present invention.

In the modified selective recirculation circuit 200' as shown in FIG. 5b, the stripping washing screen 88 and the stripping mixer 86 are also replaced by a second processing module 100'.

Figure 5C:
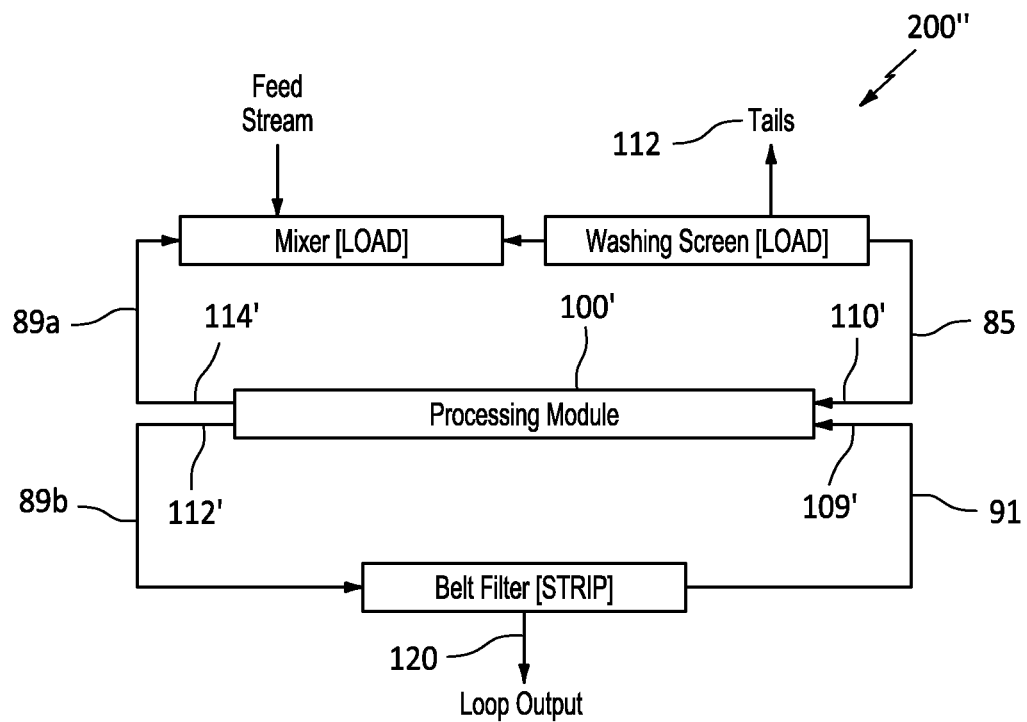
FIG. 5c illustrates a selective recirculation circuit modified to incorporate the processing module, according to yet another embodiment of the present invention.

In the modified selective recirculation circuit 200" as shown in FIG. 5c, only the stripping washing screen 88 and the stripping mixer 86 are replaced by a processing module 100.

Figure 5D:
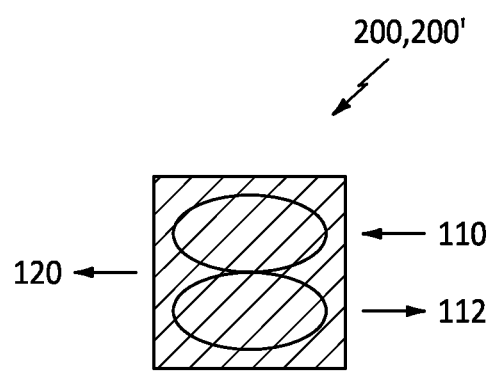
FIG. 5d illustrates a graphical representation of the modified selective recirculation circuit of FIG. 5a or 5b.

A graphical representation of the modified selective recirculation circuit 200 or 200' is shown in FIG. 5d.

Figure 6:
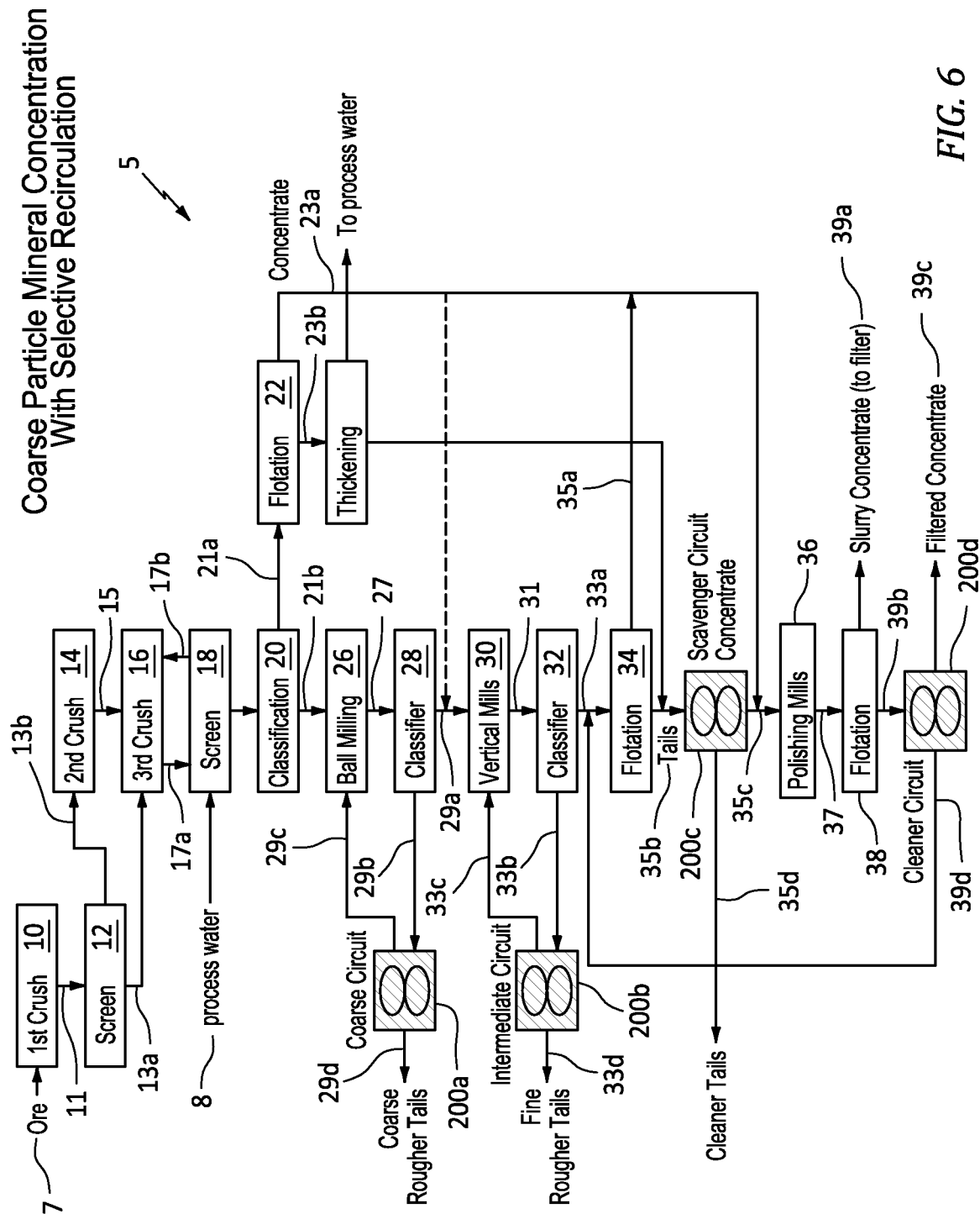
FIG. 6 is a flowsheet depicting a process of sulfide beneficiation that uses the modified selective recirculation circuit, according to an embodiment of the present invention.
Figure 7:
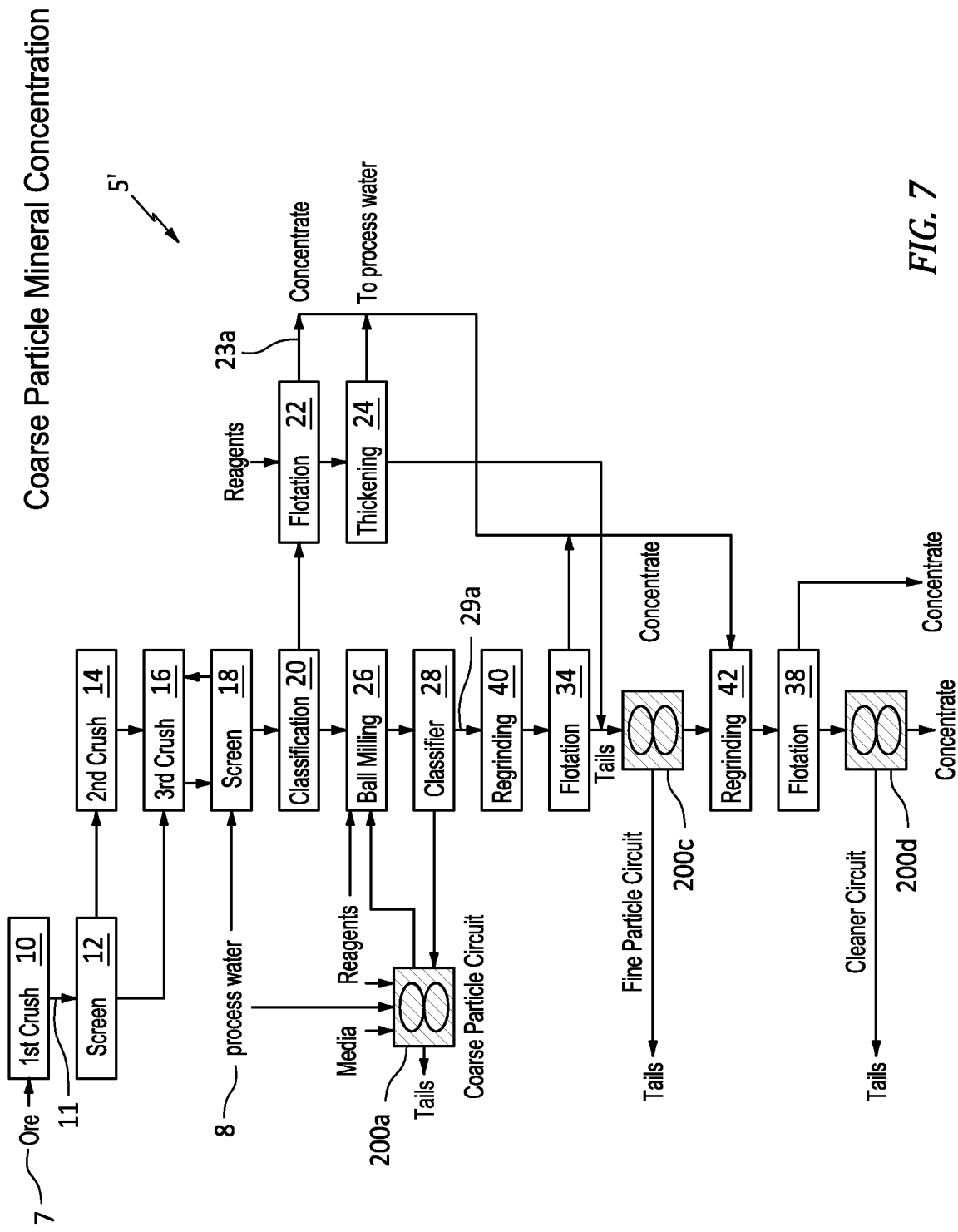
FIG. 7 is a flowsheet depicting a process of sulfide beneficiation that uses the modified selective recirculation circuit, according to another embodiment of the present invention.

The modified selective recirculation circuit 200, 200' can be used in a coarse particle mineral concentration process as shown in FIGS. 6 and 7. The use of the modified selective recirculation circuit 200, 200' in sulfide beneficiation is presented in the form of a flowsheet of processing stages. For simplicity, only modified selective recirculation circuit 200 is shown in FIGS. 6 and 7. It is understood that the modified selective recirculation circuit 200' can take place of each or some of the modified selective recirculation circuit 200 in FIGS. 6 and 7.

As seen in FIG. 6, the sulfide beneficiation process shown in flowsheet 5 comprises a first crushing stage 10 which receives ore 7 and crushes the received ore into a first comminution product 11. The first crushing stage 10 may use a gyratory crusher or a jaw crusher. The first comminution product 11 is directed to a first screening stage 12 where a screen is used to separate the coarser particles and the finer particles. The coarser particles 13b are sent to a second crushing stage 14 for further crushing. The second crushing stage 14 may use a shorthead or cone crusher designed for intermediate sizes particles. The finer particles 13a in the first comminution product 11 as well as the second comminution product 15 from the second crushing stage 14 are directed to a third crushing stage 16 for further crushing. The third crushing stage 16 may use a gyratory or high pressure grinding rolls to crush the received product into a third comminution product 17a. A second screening stage 18 is used to remove and return oversized or uncrushed particles 17b to the third crushing stage 16. The second screening stage 18 may use a screen having an average screen opening between 4 mm and 12 mm, but is usually around 5 mm. The second screening stage 18 is configured to receive process water 8 while screening the third comminution product 17a. The screened particles 19 are directed to a first classifying stage 20. The first classifying stage 20 may use a cyclone to separate the coarse, unfinished product from the fine, finished product. The first classifying stage 20 may consist of a de-sliming classifier, such as a hydrocyclone operating at a D50 cut size of around 300 to 500 microns, in order to remove most of the fine particles from the ball-mill feed 21b. The fine, finished product 21a which is probably around 20% to 30% of the total mass flow through the process, is directed to an optional first flotation stage 22. The first flotation stage 22 may use a flash flotation device (i.e. a contact cell or similar pneumatic flotation device) to recover hydrophobic sulfide particles as concentrates 23a. The flotation tails 23b are directed to a thickening stage 24 where the tails are thickened in order to recover process water 8 and return it to the second screening stage 18. The concentrates 23a are directed, optionally, to one of the downstream regrinding steps (depending on the particle size of that stream).

The ball-mill feed 21b is directed to a first milling stage 26. The first milling stage 26 may use one or more ball mills for milling. It should be noted that the ball mills in the first milling stage 26 are no longer operated in closed circuit with hydrocyclones in the second classifying stage 28. The ball mills in the first milling stage 26 are operated in open circuit. This eliminates the high circulating loads (200% to 500% of the fresh feed is recirculated to the mill) that characterize normal ball mill operations, and allows for a reduction of between 65% and 80% of size of the ball milling circuit depending on the cut size selected for the pre-classification step.

The ball mill product 27 is classified in a second classifying stage 28, which uses either a screen or a hydrocyclone operating at a D50 cut size of around 1 mm. The coarse particles 29b from the second classifying stage 28 are directed to a first modified selective recirculation circuit 200a, wherein recovered coarse particles 29c are returned to the first milling stage 26, while unrecovered particles 29d are directed to tails. This is significantly different from the traditional configuration, in which all of the coarse material is returned to the ball mills. The modified selective recirculation circuit 200a is optimized for coarse particle recovery (because there is very little detachment). As such only those particles with some exposed hydrophobic faces are contained in the recovered particles 29c to be recycled to the ball mills in the first milling stage 26. The use of the modified selective recirculation circuit 200a greatly reduces the amount of work that must be done in this comminution step.

The classifier fines 29a—now only 15% to 50% of the original feed but containing perhaps 80% to 95% of the sulfide minerals in the original feed—are then directed to a second milling stage 30 for a secondary grinding step. The second milling stage 30 may consist of vertical mills. Vertical mills are up to 35% more efficient than ball mills for processing fine particles (less than 1 mm); hence, they are a better choice for this fine grinding application. Like the previous grinding step carried out in the first milling stage 26, the vertical mills in the second milling stage 30 are configured with a product classifier in a third classifying stage 32 and another modified selective recirculation circuit 200b operating in selective recirculation configuration. This allows for the rejection of between 70% and 99% of the remaining material while recovering almost all of the reground sulfide minerals.

The vertical mill product 31 is again treated in a third classifying stage 32. As with the second classifying stage 28, the coarser particles 33b from the third classifying stage 32 are directed to a second modified selective recirculation circuit 200b, wherein recovered coarse particles 33c are returned to the second milling stage 30, while unrecovered particles 33d are directed to tails. The classifier fines 33a are directed to an optional second flotation stage 34 which may use a flash flotation device—a contact cell or other pneumatic flotation cell—to remove the finest, highest-grade particles 35a from the vertical mill product 31, to be directed to a third milling stage 36. The tails 35b from the second flotation stage 34 are then combined with the tails from the thickening stage 24 and directed to a third modified selective recirculation circuit 200c for scavenging any remaining sulfide particles. The unrecovered particles 35d from the third modified selective recirculation circuit 200c are directed to tails, while recovered sulfide particles 35c from the third modified selective modified recirculation circuit 200c are combined with the concentrates 23a from the contact cells in the first flotation stage 22 and the finest particles 35a from the second flotation stage 34 and directed to the third milling stage 36, where "polishing mills" are used for the final grinding step. The term "polishing mills" refers to the mills that are operating at very fine grinds—typically 30 to 75 microns—and therefore IsaMills or Stirred Media Detritors (SMD) would be more appropriate for this size range. The final product 37 from the third milling stage 36—containing between 1% and 5% of the original plant feed but perhaps 80% to 95% of the desirable sulfide minerals—is then directed to a third flotation stage 38 to be floated a third and final time. The high grade particles 39a is collected as slurry concentrate, while tails 39b are directed to a fourth modified selective recirculation circuit 200d. The tails 39d of the fourth modified selective recirculation circuit 200d are recycled to a prior step (the second flotation stage 34). The recovered particles 39c becomes part of the filtered concentrate.

The benefits of using the first classifying stage 20 and various selective recirculation stages, when compared to a traditional process, include:

1. The prospect of selective recirculation offers the potential for very significant energy reductions. To wit:

a. A significant portion of the plant feed—between 50% and 85% depending on the mineralogical characteristics of the sulfides—is rejected to tails before it is ground any finer than around 2 to 3 mm (P80, approximate). This offers very significant energy savings.

B. A further 10% to 40% are rejected to tails at or around 200 to 400 microns in the Intermediate or second modified selective recirculation circuit, offering further savings.

2. The higher thickening of only the fines stream rather than the entire plant tails offers the possibility of a very large reduction in the capital cost and floor space requirements of the thickeners and water recovery system.

3. The recovery of sulfide minerals at very high densities in the coarse or first modified selective recirculation stage and the Intermediate or second modified selective recirculation stage eliminate the need for copious amounts of dilution water required for the operation of traditional rougher flotation cells. This is a very significant cost savings, particularly in dry climates or at high elevation, where water pumping and perhaps desalination facilities are a large fraction of the total infrastructure costs.

4. The use of modified selective recirculation circuits, according to the present invention, does not require bubble-particle attachment, allows for a significant reduction in the flotation residence time and therefore floor space and energy requirements when compared to the traditional circuit configuration.

It should be noted that the modified selective recirculation circuit 200 or 200' can be used in two different ways in the coarse particle mineral concentration process as depicted in the flowsheet 5: One way is to provide a selective recirculation link between a milling stage and an associated classifying stage. The link is configured to receive coarse particles from the classifying stage and to discard the unrecovered particles as tails so that only the covered coarse particles are returned to the milling stage. The other way is to receive tails from a flotation stage as feed and to obtain concentrates by removing the tails from the feed (see FIGS. 2a and 3).

The incorporation of the modified selective recirculation circuit 200, 200' in coarse particle mineral concentration can be carried out differently. For example, FIG. 7 illustrates a process where only three modified selective recirculation circuits are used.

As shown in the flowsheet 5', a first regrinding stage 40 is used to replace the second milling stage 30, the third classifying stage 32 and the intermediate modified selective recirculation circuit 200b in the flowsheet 5 (FIG. 6). Furthermore, the polished milling stage 36 in FIG. 6 is now a second regrinding stage 42.

It should be noted that each of the modified selective recirculation circuits used in the process flow contains barren media and stripping solution. The barren media comprises engineered material having molecules with a functional group configured to attract the mineral particles in feed received in the modified selective recirculation circuits. The engineered material may comprise synthetic bubbles and beads having a hydrophobic surface to provide the molecules. In an embodiment of the present invention, the synthetic bubbles and beads are made of a naturally hydrophobic material. In another embodiment of the present invention, the surface of the synthetic bubbles and beads comprises a coating having a hydrophobic chemical selected from the group consisting of poly(dimethysiloxane), hydrophobically-modified ethyl hydroxyethyl cellulose polysiloxanes, alkylsilane and fluoroalkylsilane.

In a different embodiment, the surface of the synthetic bubbles and beads comprises a coating made of one or more dimethyl siloxane, dimethyl-terminated polydimethylsiloxane and dimethyl methylhydrogen siloxane. In yet another embodiment, the surface of the synthetic bubbles and beads comprises a coating made of a siloxane derivative.

In an embodiment of the present invention, where mineral particles in the modified selective recirculation circuit comprise recovered particles having exposed hydrophobic surfaces and unrecovered particles, the loading stage is configured to discharge the unrecovered particles in the tails.

FIG. 8

As disclosed above, a modified selective recirculation circuit 200 has a loading stage and a stripping stage. The loading stage comprises a mixer 82 and a washing screen 84, and the stripping stage comprises a mixer 86 and a washing screen 88. The stripping stage is linked a filter 90. In a different configuration, the mixer 82 is equivalent to a media loading stage and the washing screen 84 is equivalent to a loaded media stage. The mixer 86 is equivalent to a media stripping stage and the washing screen 88 is equivalent to a barren media recovery stage. The filter 90 is equivalent to a filtration stage. As such, the processing stages in the flowsheet 5 (FIG. 7) can be carried out with equivalent processing stages in the flowsheet 5" of FIG. 8.

Figure 8:
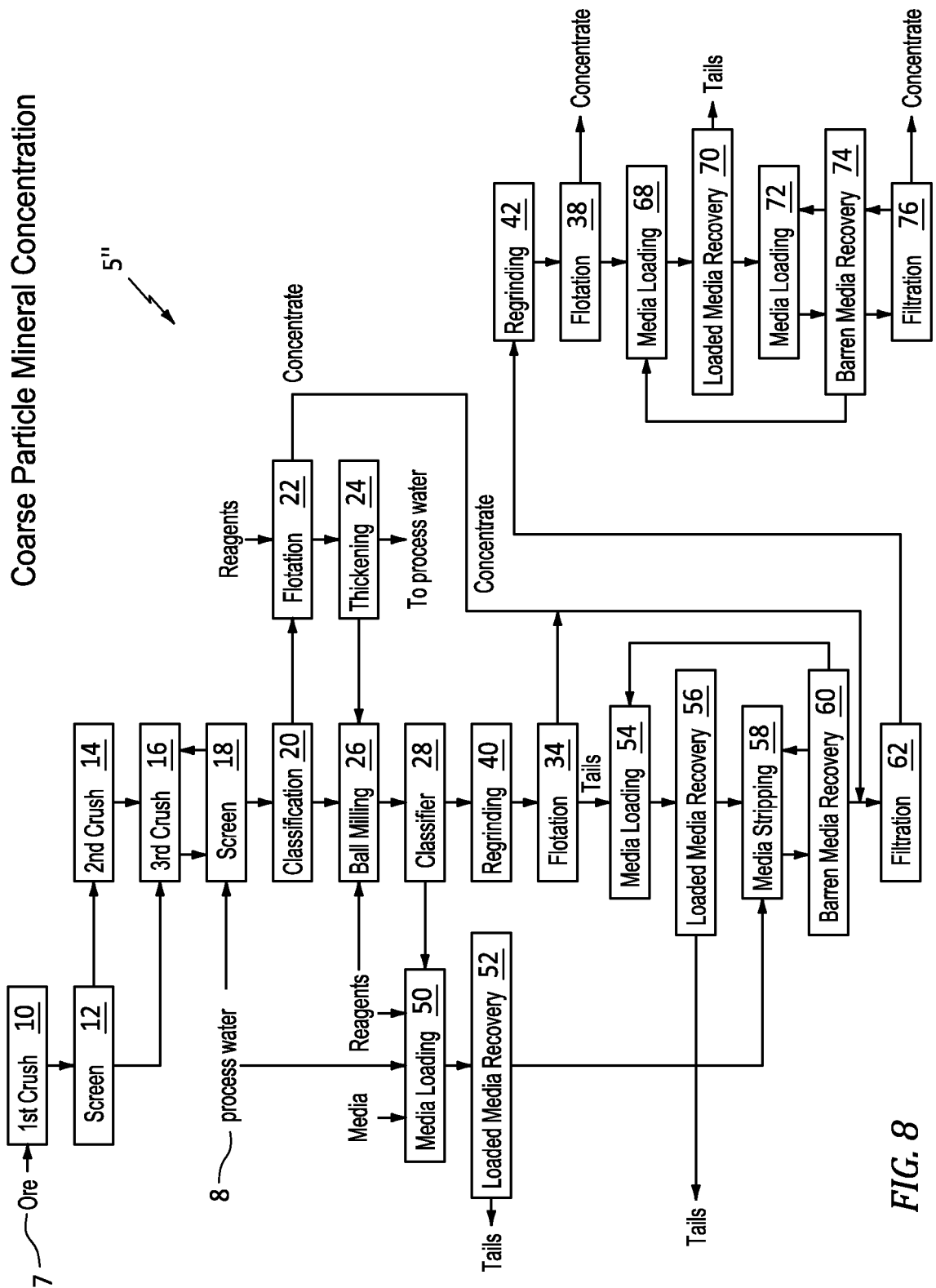
FIG. 8 is a flowsheet depicting a process of sulfide beneficiation that uses the modified selective recirculation circuit, according to a different embodiment of the present invention.

As shown in FIG. 8, the media loading stage 54 and the loaded media recovery stage 56 are equivalent to the mixer 82 and the washing screen 84 in the modified selective recirculation circuit 200c in flowsheet 5'. The media stripping stage 58 and the barren media recovery stage 60 are equivalent to the mixer 86 and the washing screen 88 in the modified selective recirculation circuit 200c. The filtration stage 62 is equivalent to the filter 90 in the modified selective recirculation circuit 200c (see FIG. 4a). Thus, the media loading stage 54, the loaded media recovery stage 56, the media stripping stage 58, the barren media recovery stage 60 and the filtration stage 62 are together equivalent to the modified selective recirculation circuit 200c in the flowsheet 5' shown in FIG. 7. Likewise, the media loading stage 68, the loaded media recovery stage 70, the media stripping stage 72, the barren media recovery stage 74 and the filtration stage 76 are together equivalent to the modified selective recirculation circuit 200d in the flowsheet 5' shown in FIG. 7. One difference between the processing flowsheet 5' of FIG. 7 and the processing flowsheet 5" of FIG. 8 is that the stripping stage and the filtering stage in after the flotation stage 34 is also used by the loading stage in the modified selective recirculation circuit 200a (see FIG. 7). As such, the media loading stage 50 and the loaded media recovery stage 52 can be linked to the media stripping stage 58. The media loading stage 50 and the loading media recovery stage 52 form a loading stage.

Figure 9:
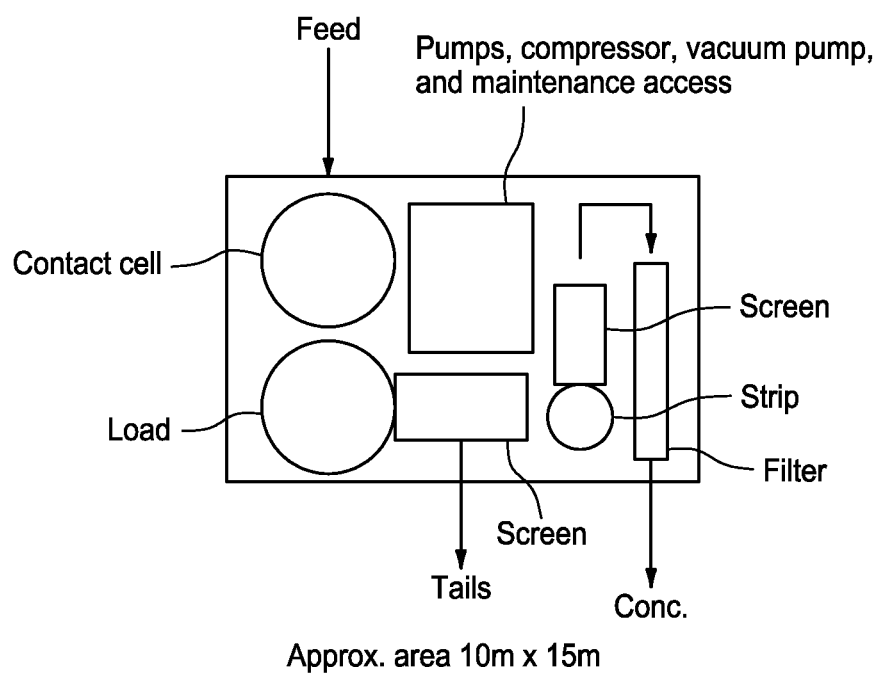
FIG. 9 is a graphical representation depicting the application of the modified selective recirculation circuit as shown in FIG. 4a or 4b.
Figure 10:
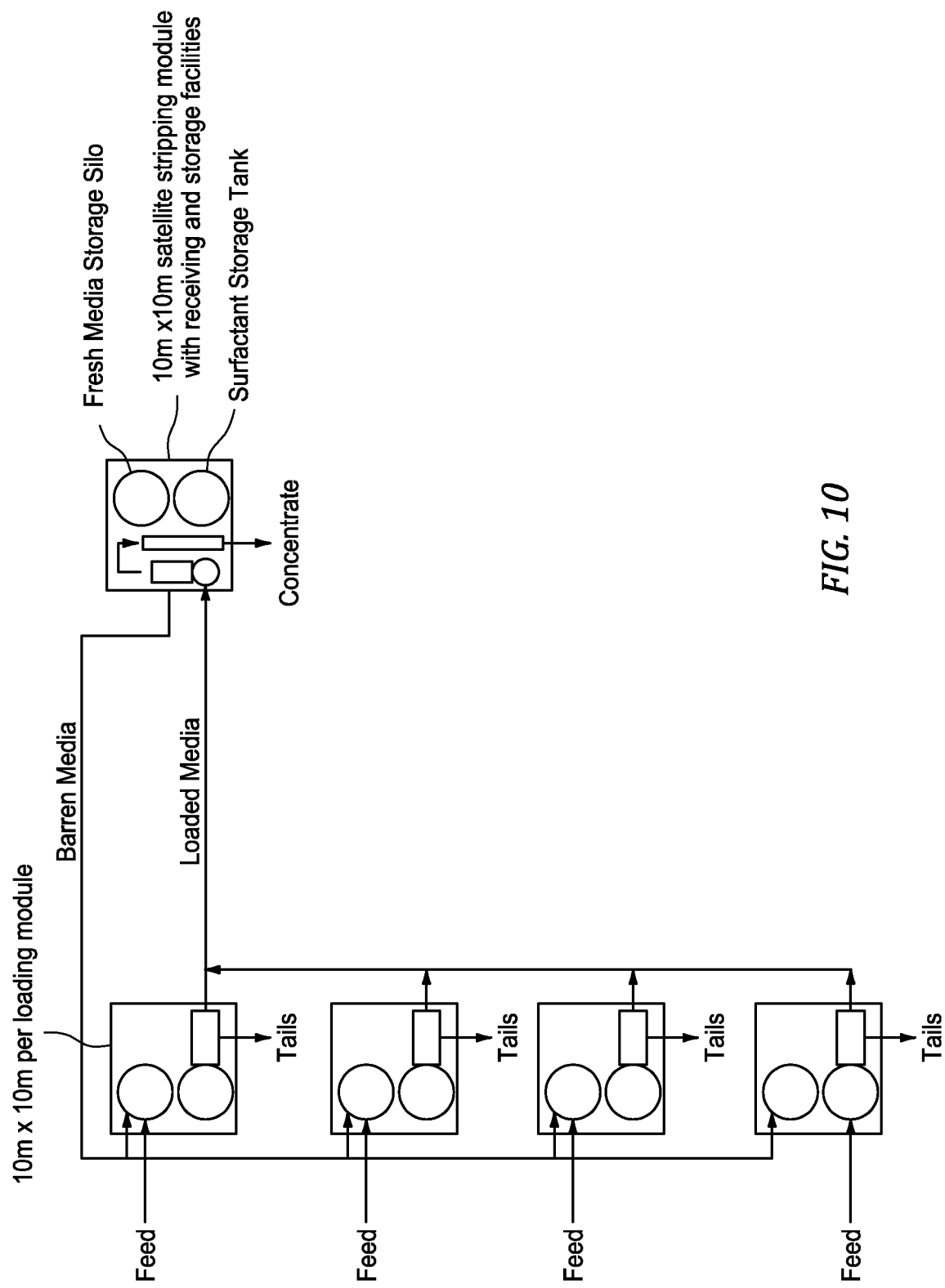
FIG. 10 is a graphical representation depicting a number of the loading stages sharing one stripping stage, according to an embodiment of the present invention.

FIGS. 9 and 10

The apparatus for extracting concentrates from the tails provided by a flotation stage as shown in FIG. 4a can be linked as a group of separate components as shown in FIG. 9. In FIG. 9, "contact cell" represents the flotation stage 92, "load" represents the mixer 82, "screen" associated with "load" represents the washing screen 84, "strip" represents the mixer 86, "screen" associated with "strip" represents the washing screen 88, "filter" represents the filter 90. "Pumps, compressor, vacuum pump and maintenance access" represents electrical and mechanical equipment used to operate the flotation cell, the mixers, washing screens and the filter. The entire group of components can be arranged in an area about 10 m×15 m. As demonstrated in the flowsheet 5" (FIG. 8), a stripping stage can be shared by two more loading stages as shown in FIG. 9.

As shown in FIG. 9, the mixer and washing screen in the loading stage, together with a flotation cell can be grouped into a loading module. The mixer and washing screen in the stripping stage, together with the filter, can be grouped into a stripping module equipped with a fresh media stage silo and a surfactant storage tank. Practically, the loading module can be arranged in an area about 10 m×10 m, the stripping module can also be arranged in an area about 10 m×10 m. In illustrated in FIG. 10, a plurality of loading modules can share one stripping module.

FIGS. 11a-14b

The processing module 100 and the modified selective recirculation circuit, according to various embodiments of the present invention can also be used copper/molybdenum (Cu/Mo) processing. In a Cu/Mo processing system, ground ore is mixed with sea water to form a slurry in a roughing circuit. Comminution and rougher flotation steps are then followed. The desirable minerals in the slurry typically includes chalcopyrite, bornite and molybdenite. The unwanted materials include undesirable sulfide minerals such as pyrite. In order to render the sulfide minerals hydrophobic, xanthate collectors or other surfactants are used. Lime (CaO) is also used to increase the pH of sea water to 9 to 10.5 so as to recover all of the sulfides in a floating process or non-flotation recovery process.

The recovered sulfides are directed to a cleaning circuit, whereas the tailings containing gangue are directed to a rougher tails thickening stage. Reclaimed sea water from the rougher tails thickening stage can be recycled back to the process water tank/Distribution network. The thickened rougher tails is directed to a pond or the like for impoundment.

In the cleaning circuit, the remaining ore containing the recovered sulfides is reground at a regrinding stage and lime is again added to the processed slurry. Because untreated sea water contains salts, particularly those of magnesium and calcium, when combined with the pH buffering effect of sea water at pH above approximately 9.5, the use of lime is constrained in depressing pyrite. Desalinated makeup water is used in the regrinding stage. As such, metabisulfide (MBS) such as sodium metabisulfide (NaMBS) or potassium metabisulfide (KMBS) is not needed for depressing pyrite at the cleaner flotation stage. At the cleaner flotation stage, the high pyrite cleaner tails are directed to a cleaner tails dewatering stage. The copper/molybdenum concentrate from the cleaner flotation stage is directed to a bulk concentration thickener stage. The high pyrite tails from the cleaner flotation stage, after dewatered at the dewatering stage, may be directed to the tails impoundment stage. Desalinated water reclaimed from the cleaner tails dewatering stage and from the bulk concentrate thickener stage can be directed back to the regrinding stage. Underflow from the bulk concentrate thickener stage may be mixed and conditioned with sodium hydrosulfide (NaHS) in order to render the copper and iron sulfide minerals hydrophilic so as to form a conditioned pulp. Thus the conditioned pulp hydrophobic molybdenum minerals and hydrophilic copper minerals that is conditioned with sodium hydrosulfide. The conditioned pulp may be processed in a moly plant with desalinated water to separate the copper concentrate from the molybdenum concentrate. A typical Cu/Mo flotation circuit is shown in FIG. 11a.

Figure 11A:
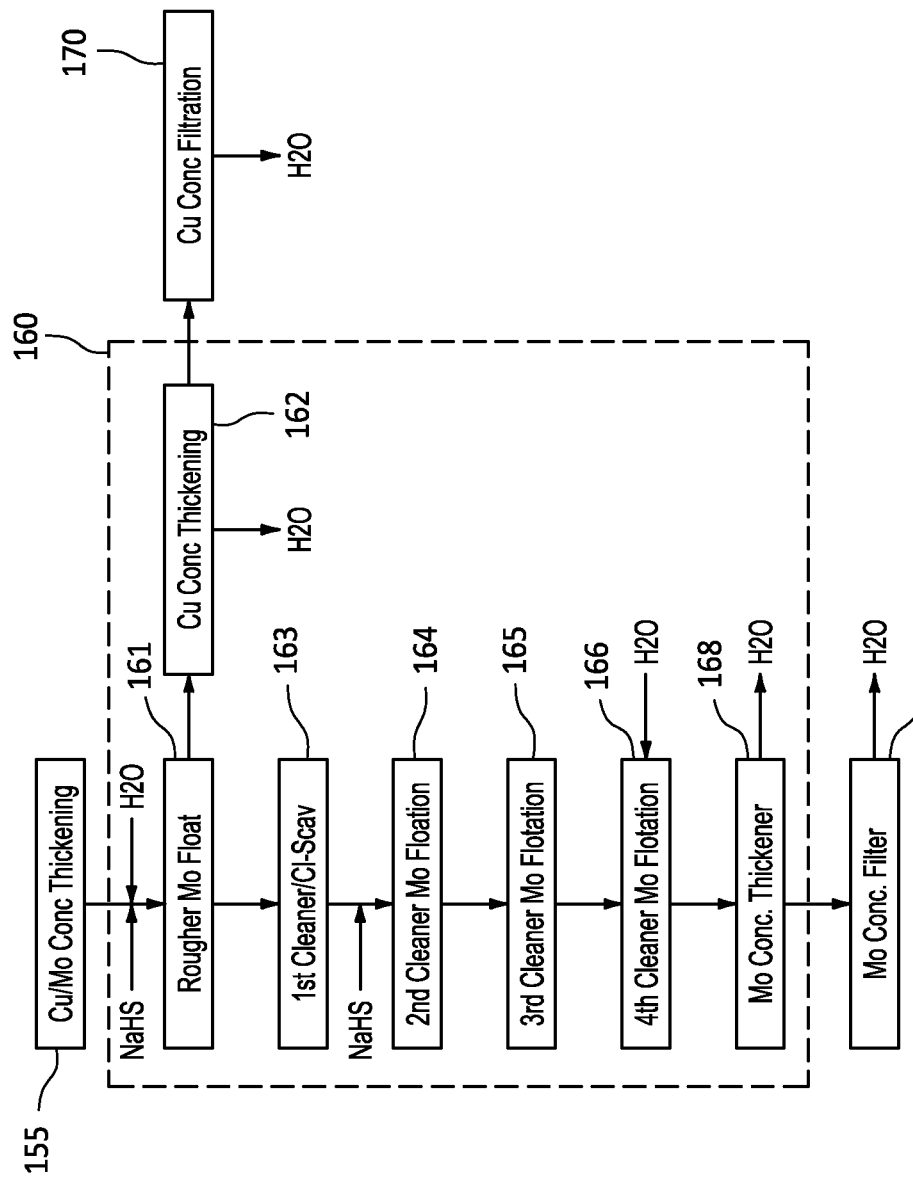
FIG. 11a is a flowsheet depicting a current process of Cu/Mo flotation.

In FIG. 11a, the processing steps that are relevant to the present invention are in the Moly plant 160. In the Moly plant 160 include a rougher Mo flotation stage 161, a Cu concentrate thickening stage 162, a cleaner Mo flotation stage 167 and a Mo concentrate thickening stage 168. The output from the Cu concentrate thickening stage 162 is conveyed to a Cu concentrate filtration stage 170 and the output from the Mo concentrate thickening stage 168 is conveyed to a Mo concentrate filtration stage 169.

Figure 11B:
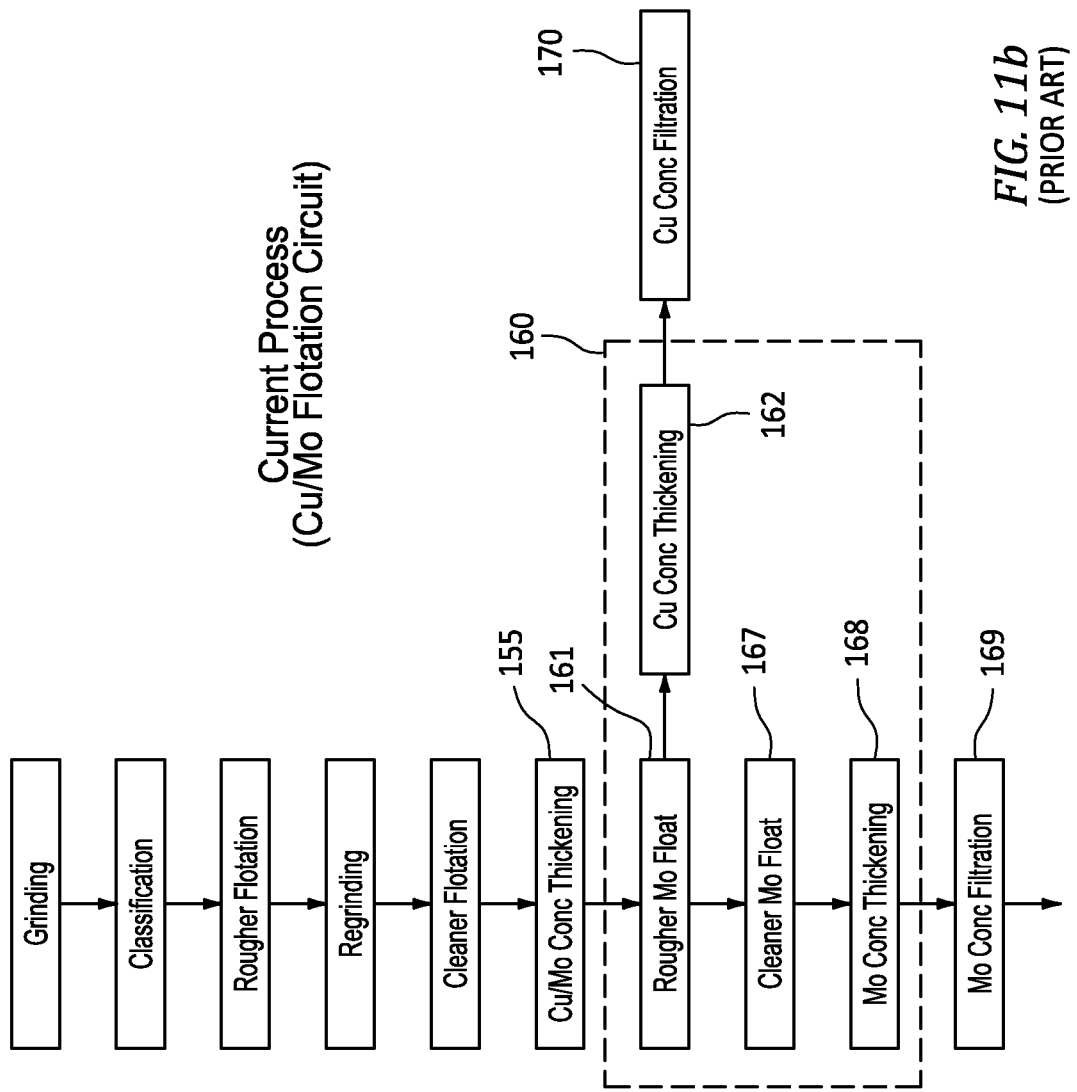
FIG. 11b is a flowsheet depicting a moly plant detail in Cu/Mo flotation.

FIG. 11b shows the details of the moly plant 160 where the cleaner Mo flotation stage may comprise four different stages 163-166.

Figure 12:
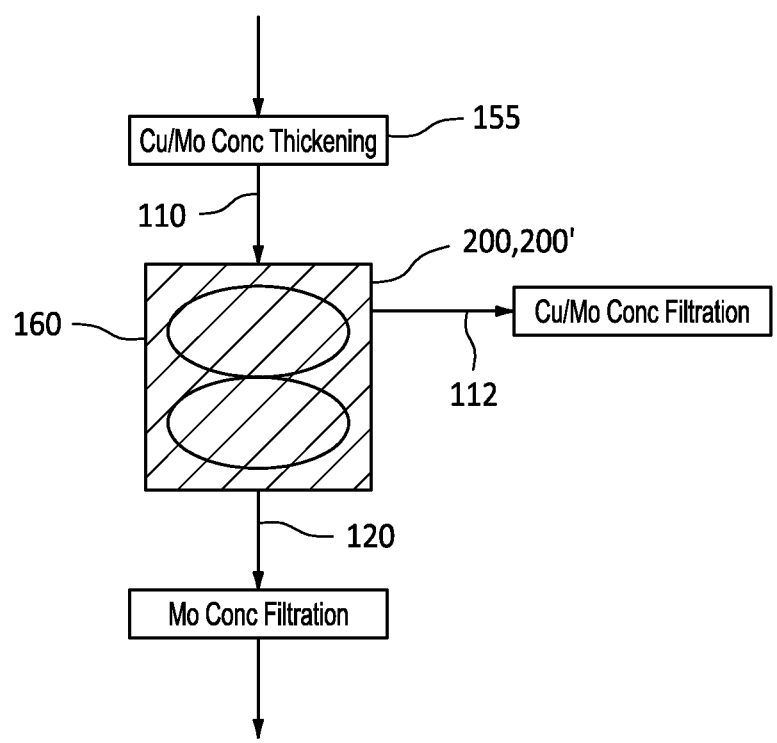
FIG. 12 is a flowsheet depicting the Cu/Mo flotation process using the modified selective recirculation circuit, according to an embodiment of the present invention.

According to an embodiment of the present invention, the modified selective recirculation circuit 200, 200' can be used to replace all the processing stages in the Moly plant 160 as shown in FIG. 12.

Figure 13:
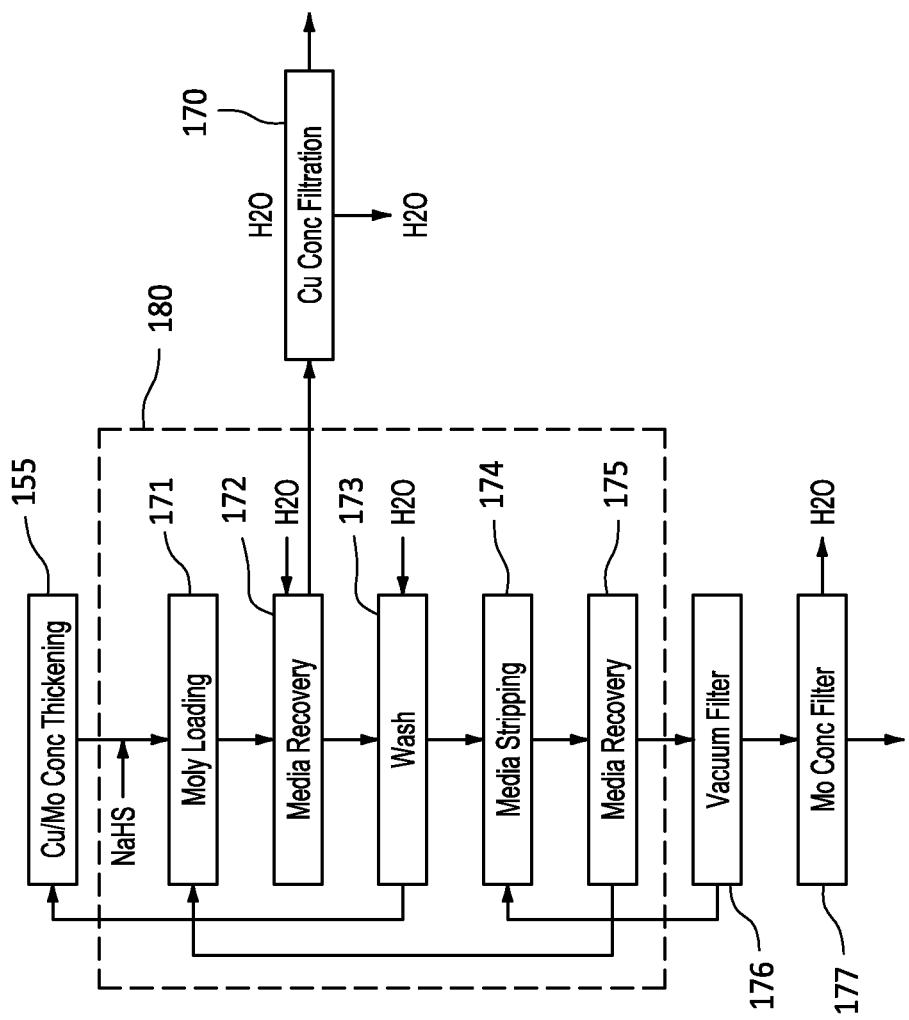
FIG. 13 is a flowsheet depicting a Cu/Mo separation media technology.

FIG. 13 illustrates another moly plant that can incorporate the modified selective recirculation circuit 200, 200'.

By way of example, the process of the moly plant 180, starting with the bulk sulfide concentrate, operates as follows.

1. Underflow from a bulk sulfide thickener ("Cu/Mo Conc Thickener") in step/stage 155 may be mixed and conditioned with sodium hydrosulfide (NaHS) in order to render the copper and iron sulfide minerals hydrophilic, so as to form a conditioned pulp.

2. In a molybdenum loading step/stage 171, the conditioned pulp may be contacted with the engineered polymeric hydrophobic media, e.g. in an agitated reaction chamber, and hydrophobic molybdenite is loaded on the engineered polymeric hydrophobic media, so as to form a slurry/media mixture. By way of example, the agitated reaction chamber may include, or take the form of, a tumbler-style reaction chamber, as well as a mechanical, rotating/tumbling, gravity flow, chemical, pneumatic, centrifugal reaction chamber. The engineered polymeric hydrophobic media may take the form of engineered polymeric bubble/beads, e.g., consistent with that set forth herein. The engineered polymeric hydrophobic media may also take the form of other engineered polymeric hydrophobic media disclosed herein.

3. The slurry/media mixture may be fed to a media recovery step/stage 172, e.g. consisting of a vibrating screen, rotating trommel or equivalent size- or other separation device, so as to recover a slurry product and a polymerized hydrophobic media product. As shown in Figure *A, water ($H^2O$) may be added to the recovery media stage 172. In the media recovery step/stage 172, the slurry product may be directed to a copper concentrate filtration step/stage and the engineered polymeric hydrophobic media product may be directed to a wash step/stage 173. The copper concentrate filtration step/stage 170 filters and provides a copper concentrate. The media recovery step/stage 172 can be incorporated into the molybdenum loading step/stage 171.

4. By way of example, the media wash step/stage 173 may consist of a vibrating screen, trommel or equivalent equipped with wash water sprays to clean the loaded engineered polymeric hydrophobic media and eliminate the entrainment of hydrophilic particles. As shown in FIG. 13, water ($H_2O$) may be added to the wash step/stage 173. In the media wash step/stage 173, the media may be advanced to a stripping stage 74 and the wash solution, e.g., containing any residual hydrophilic particles, is returned to the Cu/Mo thickening step/stage 155.

5. The cleaned media reports or may be provided to the media stripping step/stage 174 to remove the loaded hydrophobic minerals from the engineered polymeric hydrophobic media using a strip solution, surfactant, or equivalent.

6. The media stripping step/stage 174 may be configured to direct the slurried mixture of stripped media, recover hydrophobic particles and residual strip solution to a second media recovery step/stage 175, e.g., consisting of a screen, trommel, or equivalent device. The second media recovery step/stage 174 may be configured to recycle/return recovered media to the moly loading step/stage 171, and provide the remaining slurried mixture to a vacuum filter step/stage 176.

7. The vacuum filter step/stage 176 may be configured to recycle recovered strip solution to the media stripping step/stage 174, and filter and direct residual slurry, e.g., having recovered hydrophobic particles, to a moly concentration filter or filtration step/stage 82 that filters and provides molybdenum concentrate.

Embodiments are also envisioned, and the scope of the invention is intended to include, e.g., implementing the aforementioned Cu/Mo separation media technology consistent with that set forth above, followed by a subsequent regrind step to improve liberation and the resulting grade.

Embodiments are also envisioned, and the scope of the invention is intended to include, e.g., implementing the aforementioned Cu/Mo separation media technology consistent with that set forth above, using multiple loading/stripping cycles also to improve liberation and the resulting grade.

Figure 14A:
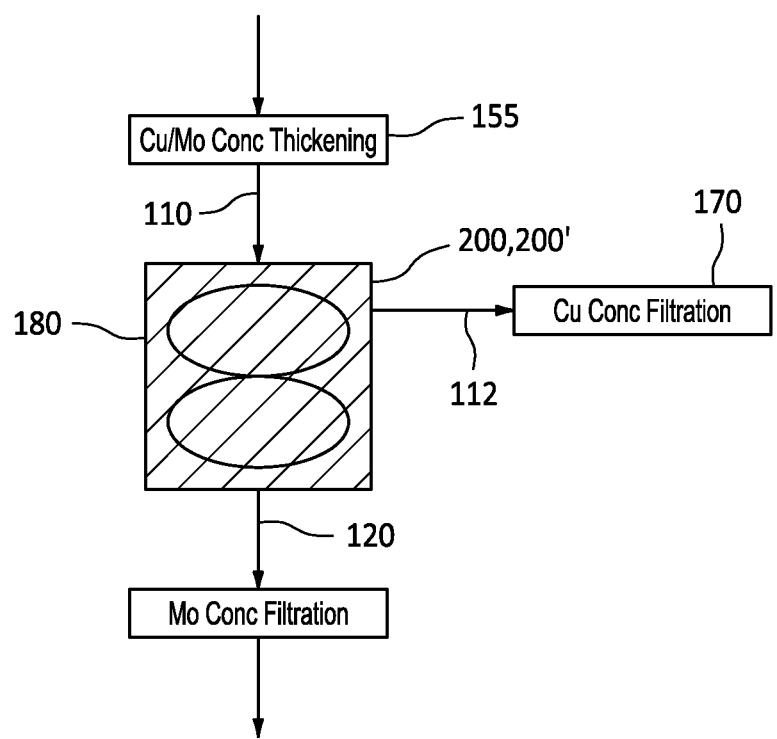
FIG. 14a is a flowsheet depicting a Cu/Mo separation process using the modified selective recirculation circuit, according to an embodiment of the present invention.
Figure 14B:
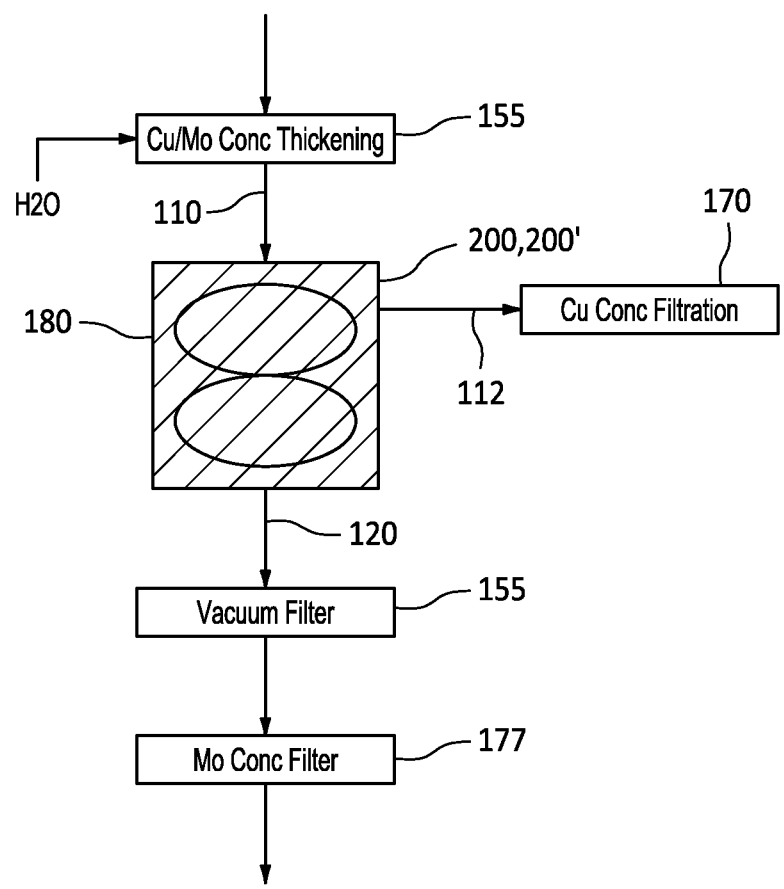
FIG. 14b is a flowsheet depicting a Cu/Mo separation process using the modified selective recirculation circuit, according to another embodiment of the present invention.

According to an embodiment of the present invention, the modified selective recirculation circuit 200. 200' is used to replace the steps/stages 171 to 176 as shown in FIG. 14a. According to another embodiment of the present invention, the modified selective recirculation 200 is used to replace the steps/stages 171 to 175 as shown in FIG. 14b. It should be noted that moly loading stage 171 and the media recovery stage 172 can be combined into one stage.

FIGS. 15a-16b

The processing module 100 does not have moving parts to mix the slurry and the polymer-coated media in the loading compartment 104 for loading the polymer-coated media with the mineral particles in the slurry. The processing module 100 does not have moving parts in the separation compartment to separate the loaded media from the unwanted materials in the slurry. The processing module 100 relies on various static forces and/or structural features to mix the slurry with the polymer-coated media for loading purposes, and to separate the loaded media from the unwanted materials in the slurry and separately discharge them through a first output and a second output. For example, the separation compartment is configured to separate the loaded media from the unwanted materials in the slurry in the presence of a static force and the polymer-coated media have a physical property that is responsive to the static force. The static force can be a force from a magnetic field or from gravity, and the physical property of the polymer-coated media can be magnetic or density.

Figure 15A:
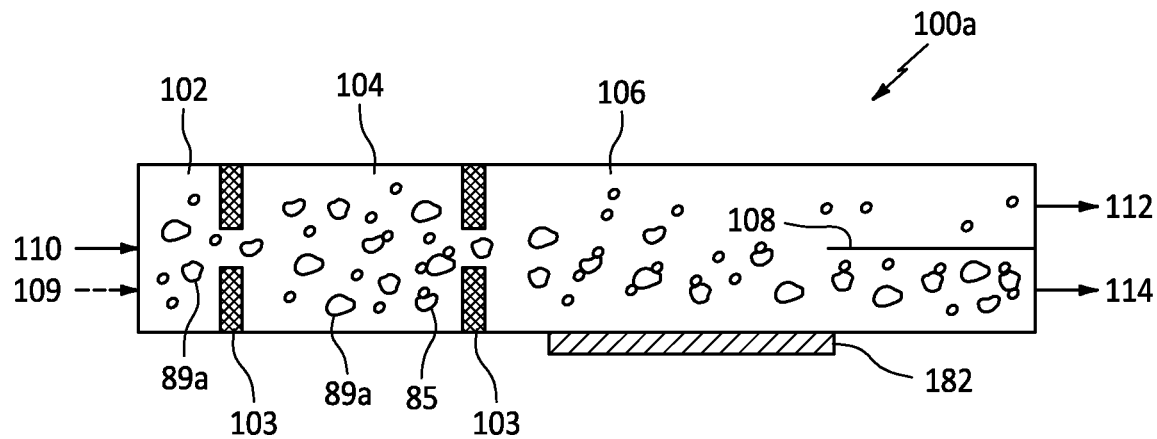
FIG. 15a illustrates a mineral concentration device based on the processing module, according to an embodiment of the present invention.

According to an embodiment of the present invention, the polymer-coated media comprise a plurality of synthetic beads, each of the synthetic beads having a core containing a magnetic material such as steel. In order to separate the loaded media from the unwanted materials in the slurry, a magnetic source 182 located in relationship to the separating compartment 106 configured to generate the magnetic field so as to draw the loaded media to the first output 114 as shown in FIG. 15a. According to an embodiment of the present invention, the processing module 110a comprises a PVC pipe, wherein venturis or orifice plates are used in the loading compartment 104 to disturb the slurry flow so as to enhance the loading of the polymer-coated media with mineral particles. A separation barrier 108 is used to guide the loaded media to the first output 112 and the unwanted materials to the second output 114.

Figure 15B:
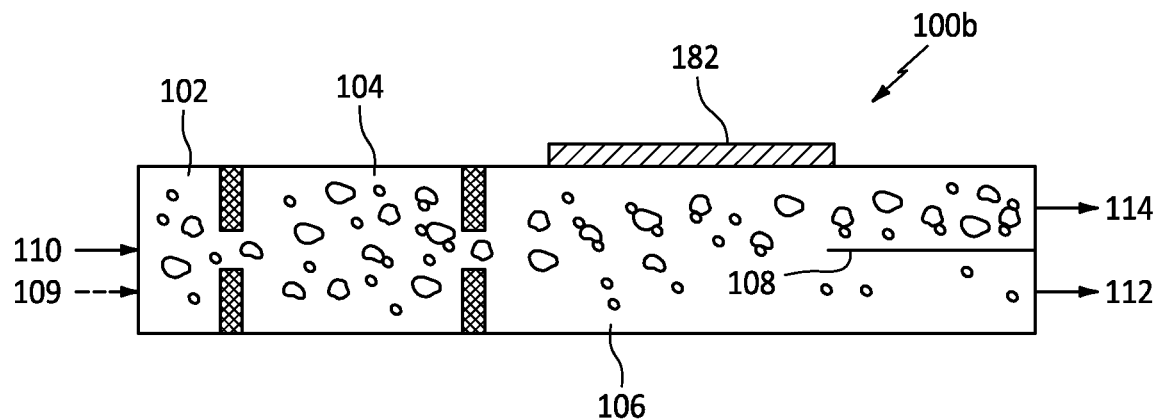
FIG. 15b illustrates a mineral concentration device based on the processing module, according to another embodiment of the present invention.

According to an embodiment of the present invention, the synthetic bead containing a magnetic material is buoyant in the slurry. The magnetic source 182 is placed near the top part of the separation compartment to separate the loaded media from the unwanted materials as shown in FIG. 15b especially when the polymer-coated media are buoyant in the slurry.

Figure 15C:
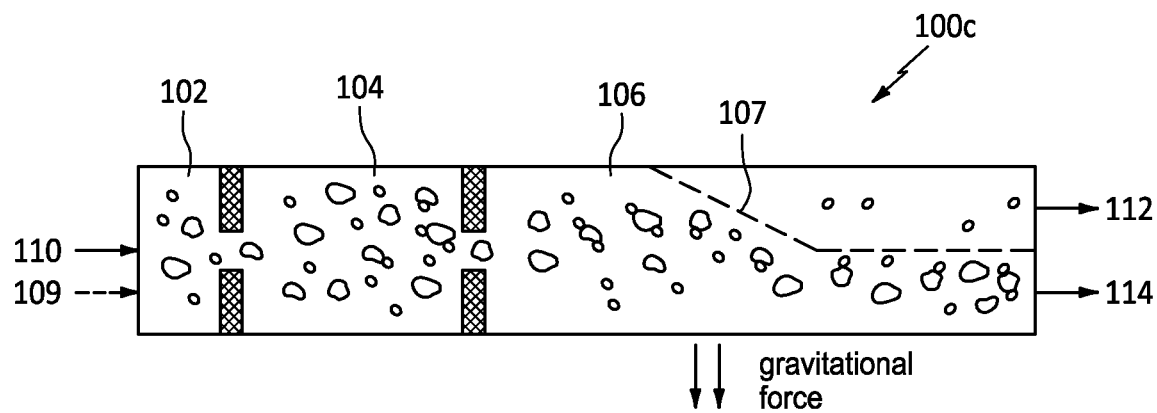
FIG. 15c illustrates a mineral concentration device based on the processing module, according to yet another embodiment of the present invention.

According to an embodiment of the present invention, the polymer-coated media comprise a plurality of synthetic beads, each of the synthetic beads having a bead density greater than a density of the slurry so as to allow the loaded media to be separated from the unwanted materials by the gravity force, a screen 107 as shown in FIG. 15c can also be used to guide the loaded media to the first input 112.

According to an embodiment of the present invention, the polymer-coated media comprise a plurality of synthetic beads, each of the synthetic beads having a bead size larger than the unwanted materials. A screen 107 located in the separating compartment configured to separate the loaded media and the unwanted materials.

Figure 15D:
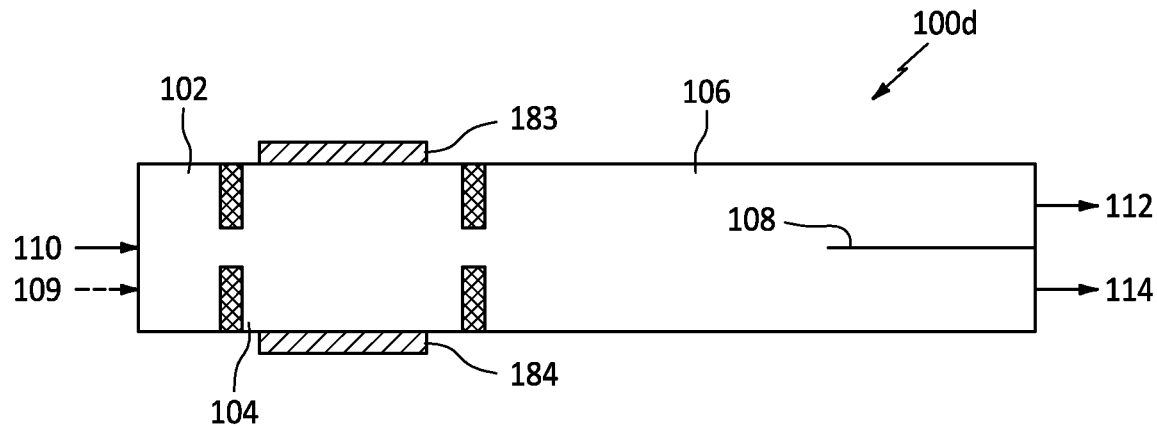
FIG. 15d illustrates a mineral concentration device based on the processing module, according to a different embodiment of the present invention.

According to an embodiment of the present invention, when the polymer-coated media are magnetically responsive, a magnetic field generating source 183 and a magnetic field generating source 184 placed near the loading compartment 104 can be alternately turned on and off to stir the polymer-coated media in the slurry, as shown in FIG. 15d.

Figure 15E:
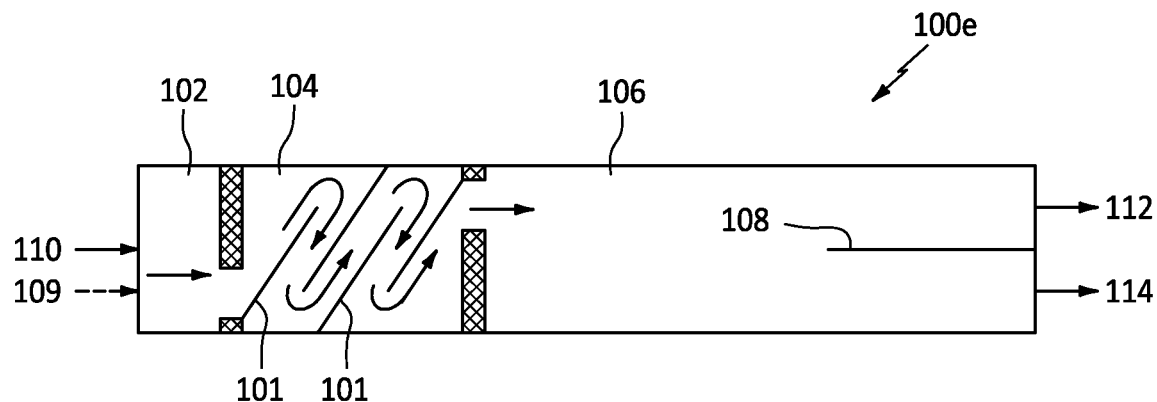
FIG. 15e illustrates the mixing/loading section in the processing module, according to an embodiment of the present invention.

According to an embodiment of the present invention, flow redirecting plates 101 are used to extend the path of the slurry flow in the loading compartment 104 as shown in FIG. 15e. The extended slurry path enhances the loading of the polymer-coated media with the mineral particles in the slurry.

Figure 15F:
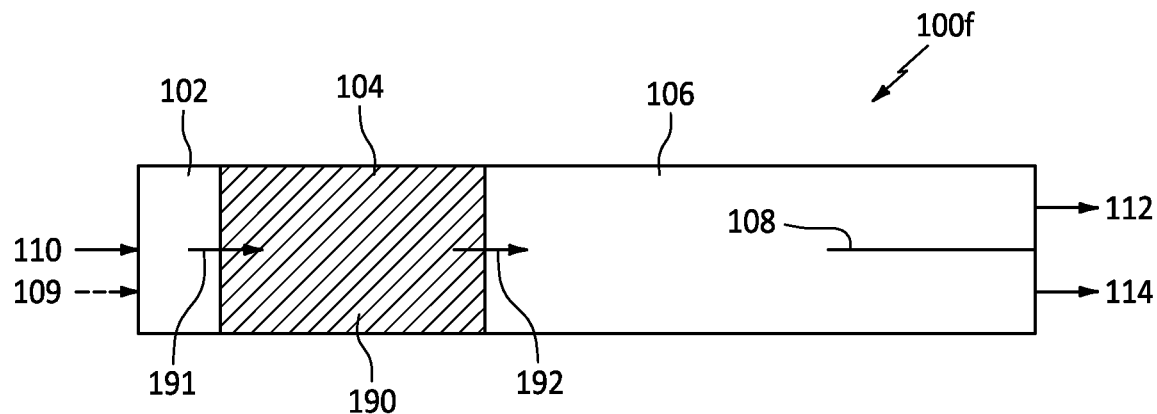
FIG. 15f illustrates the mixing/loading section in the processing module, according to an embodiment of the present invention.

According to an embodiment of the present invention, the loading compartment 106 has a path extension structure 190 having an input 191 to receive the polymer-coated media and the slurry from the receiving compartment 102 and an output 192 to provide the loaded media to the separation compartment 106 as shown in FIG. 15f.

Figure 16A:
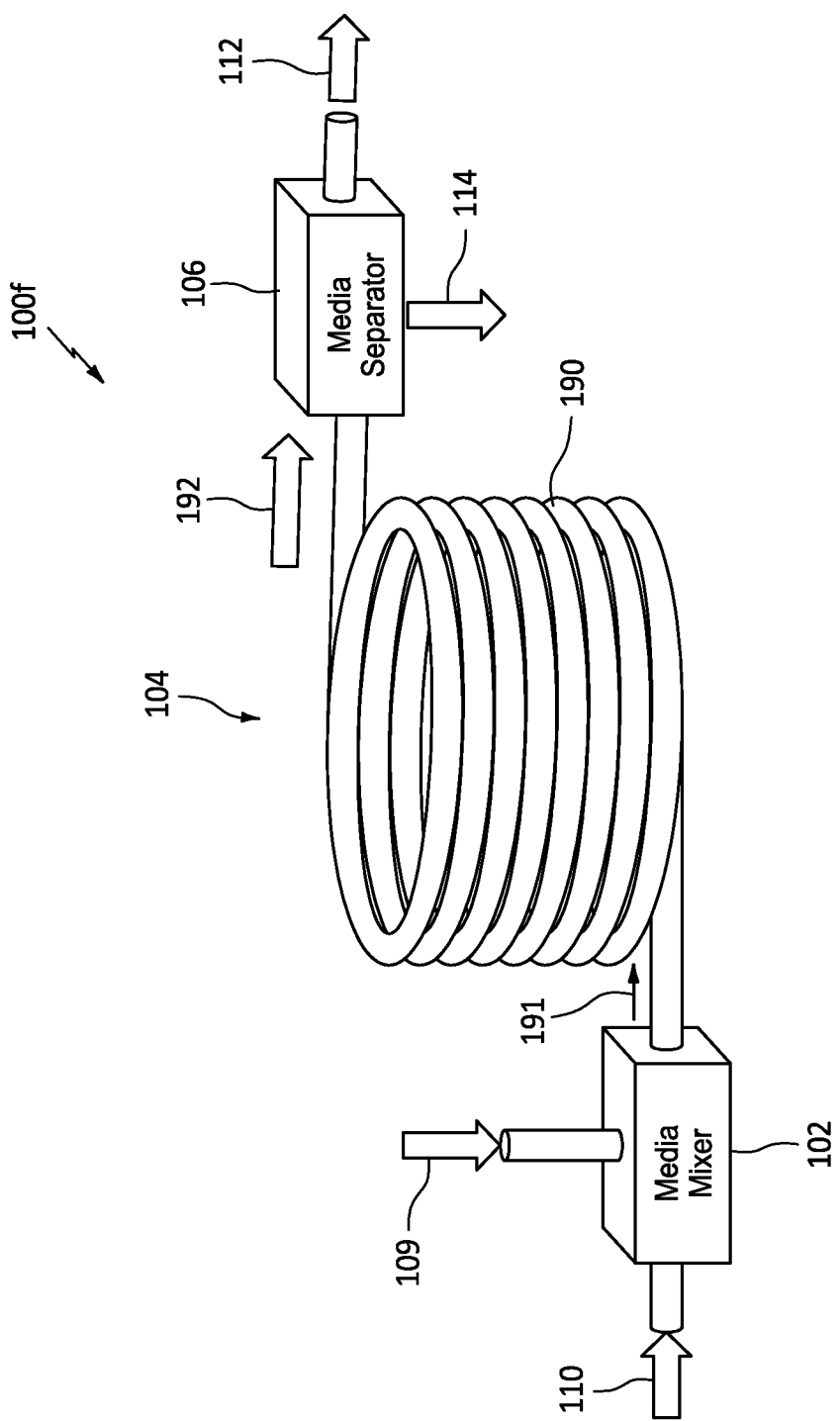
FIG. 16a illustrates a loop structure used as the mixing/loading section in the processing module, according to an embodiment of the present invention.

According to an embodiment of the present invention, the path extension structure 190 comprises a loop structure as shown in FIG. 16a. The loop structure 190 is configured to extend the slurry flow in order to enhance the loading of the polymer-coated media with the mineral particles.

Figure 16B:
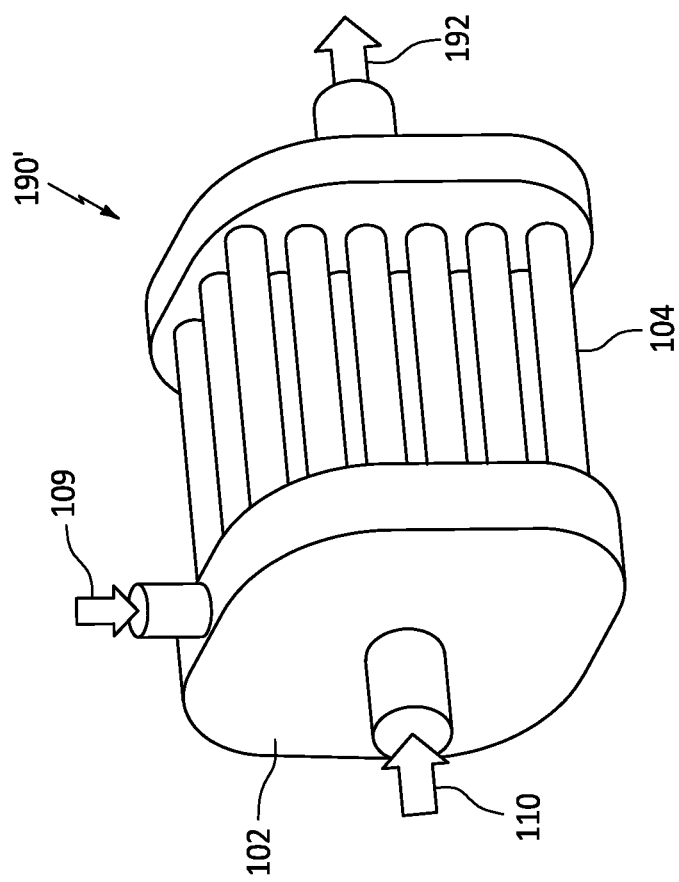
FIG. 16b illustrates a piping manifold used as the mixing/loading section in the processing module, according to an embodiment of the present invention.

According to an embodiment of the present invention, the path extension structure 190' comprises a pipe manifold as shown in FIG. 16b to extend the slurry flow in order to enhance the loading of the polymer-coated media with the mineral particles.

It is understood that each of the processing modules as shown in FIGS. 15a-15e and 16a-16b can be linked to a stripping stage and a filtering stage as shown in FIG. 4a to become a modified selective recirculation circuit 200 of FIG. 5a, for example. Two of such processing modules can also be used as shown in FIG. 4b.

According to an embodiment of the polymer-coated media (barren media) and the synthetic beads have a surface having a hydrophobic chemical selected from the group consisting of poly(dimethysiloxane), hydrophobically-modified ethyl hydroxyethyl cellulose polysiloxanes, alkylsilane and fluoroalkylsilane.

According to an embodiment of the present invention, the surface of the synthetic bubbles and beads comprises a coating made of one or more dimethyl siloxane, dimethyl-terminated polydimethylsiloxane and dimethyl methylhydrogen siloxane.

The modified selective recirculation circuit 200, 200' can be used in sulfide beneficiation process as shown in FIGS. 6-8. The modified selective recirculation circuit 200, 200' can be used in Cu/Mo flotation process as shown in FIGS. 12, 14a and 14b.

Thus, although the invention has been described and illustrated with respect to exemplary embodiments thereof, the foregoing and various other additions and omissions may be made therein and thereto without departing from the spirit and scope of the present invention.

What is claimed is:

1. An apparatus having a first end and an opposing second end, comprising:
    a plurality of polymer-coated media having hydrophobic surfaces to attract mineral particles in a slurry, the slurry also containing unwanted materials;
    a loading compartment configured to receive the slurry having the polymer-coated media and the unwanted material from the first end, disturb the slurry and load the polymer-coated media with the mineral particles to form loaded media, and provide the slurry having the loaded media and the unwanted material; and
    a separation compartment configured to receive the slurry from the loading compartment, and to separate the loaded media from the unwanted materials in the slurry in response to a static force, the separation compartment comprising a first output and a second output on the second end, the first output configured to discharge the loaded media and the second output configured to discharge the unwanted materials.

2. The apparatus according to claim 1, wherein the polymer-coated media comprise a physical property responsive to the static force.

3. The apparatus according to claim 2, wherein
    the static force comprises a magnetic field;
    the polymer-coated media comprise a plurality of synthetic beads, each of the synthetic beads having a core containing a magnetic material responsive to the magnetic field; and
    the apparatus further comprising a magnetic source located in relationship to the separation compartment configured to generate the magnetic field so as to direct the loaded media to the first output.

4. The apparatus according to claim 3, wherein
    the polymer-coated media comprise a plurality of synthetic beads, each of the synthetic beads having a bead size larger than the unwanted materials; and
    the apparatus further comprising; a screen located in the separation compartment configured to separate the loaded media and the unwanted materials.

5. The apparatus according to claim 3, further comprising:
    a further magnetic source located near the loading compartment configured to stir the polymer-coated media so as to enhance loading of the polymer-coated media with the mineral particles.

6. The apparatus according to claim 3, wherein the surface of the synthetic bubbles and beads comprises a coating made of one or more dimethyl siloxane, dimethyl-terminated polydimethylsiloxane and dimethyl methylhydrogen siloxane.

7. The apparatus according to claim 2, wherein the static force comprises a gravitational force and the polymer-coated media comprise a plurality of synthetic beads, each of the synthetic beads having a bead density greater than a density of the slurry so as to allow the loaded media to sink in the separation compartment and to move toward the first output.

8. The apparatus according to claim 2, wherein the static force comprises a buoyant force and the polymer-coated media comprise a plurality of synthetic beads, each of the synthetic beads having a bead density smaller than a density of the slurry so as to allow the loaded media to float in the separation compartment and to move toward the first output.

9. The apparatus according to claim 1, wherein
    the loading compartment comprises an input to receive the polymer-coated media and the slurry, the slurry configured to form a flow from the input of the loading compartment to the separation compartment, and
    the apparatus further comprising; venturis or an orifice plate located in the loading compartment and configured to disturb the flow in the loading compartment so as to enhance loading of the polymer-coated media with the mineral particles.

10. The apparatus according to claim 1, wherein
    the loading compartment comprises an input to receive the polymer-coated media and the slurry, the slurry configured to form a flow from the input of the loading compartment to the separation compartment, and
    the apparatus further comprising; continuous loops located in the loading compartment and configured to extend a path of the flow from the loading compartment to the separation compartment so as to enhance loading of the polymer-coated media with the mineral particles.

11. The apparatus according to claim 1, wherein
    the loading compartment comprises an input to receive the polymer-coated media and the slurry, the slurry configured to form a flow from the input of the loading compartment to the separation compartment, and
    the apparatus further comprising a connected pipe manifold located in the loading compartment and configured to extend a path of the flow from the loading compartment to the separation compartment so as to enhance loading of the polymer-coated media with the mineral particles.

12. The apparatus of claim 1, further comprising:
    a stripping stage configured to receive the loaded media from the first output and to strip the loaded media with a stripping solution into a first portion comprising the polymer-coated media and a second portion containing the mineral particles and the stripping solution; and
    a filtering stage configured to separate the mineral particles from the stripping solution in the second portion.

13. The apparatus according to claim 1, wherein the polymer-coated media comprise a plurality of synthetic beads, each of the synthetic beads having a surface having a hydrophobic chemical selected from the group consisting of poly(dimethysiloxane), hydrophobically-modified ethyl hydroxyethyl cellulose polysiloxanes, alkylsilane and fluoroalkylsilane.

14. The apparatus according to claim 1, wherein the loading compartment comprises a connected pipe manifold having multiple pipes to extend the path of the slurry flowing in the loading compartment, and disturb the slurry to enhance loading of the polymer-coated media with the mineral particles.

15. The apparatus according to claim 1, wherein the loading compartment comprises flow redirecting plates to extend the path of the slurry flowing in the loading compartment, and disturb the slurry to enhance loading of the polymer-coated media with the mineral particles.

16. The apparatus according to claim 1, wherein the loading compartment comprises a loop structure to extend the path of the slurry flowing in the loading compartment, and disturb the slurry to enhance loading of the polymer-coated media with the mineral particles.

17. The apparatus according to claim 1, wherein the separation compartment comprises a separating barrier configured to guide and separate the load media to the first output and the unwanted material to the second output.

18. The apparatus according to claim 1, wherein the separation compartment comprises a screen configured to guide and separate the load media to the first output and the unwanted material to the second output.

19. A mineral processor, comprising
a bulk sulfide thickener arranged to receive a slurry containing copper minerals and hydrophobic molybdenum minerals, the bulk sulfide thickener comprising sodium hydrosulfide to render the copper minerals hydrophilic;
a processing module having a first end and a second end, the processing module comprising a loading compartment and a separation compartment, wherein
the loading compartment is configured to receive polymer-coated media and the slurry from the first end, disturb the slurry and load the polymer-coated media with the molybdenum minerals to form loaded media, and provide the slurry having the loaded media with the copper minerals; and
the separation compartment is configured to receive the slurry having the loaded media from the loading compartment, and to separate the loaded media from the copper minerals in the slurry in response to a static force, the separation compartment comprising a first output and a second output on the second end, the first output configured to discharge the loaded media and the second output configured to discharge the copper minerals;
a stripping stage configured to receive the loaded media from the first output and to strip the loaded media with a stripping solution into a first portion comprising the polymer-coated media and a second portion containing the molybdenum minerals and the stripping solution; and
a filtering stage configured to separate the molybdenum minerals from the stripping solution in the second portion.

20. The mineral processor according to claim 19, wherein the separation compartment configured to separate the loaded media from the copper minerals in the slurry in the presence of a static force, and wherein the polymer-coated media comprise a physical property responsive to the static force.

21. The mineral processor according to claim 20, wherein the static force comprises a magnetic field, and the polymer-coated media comprise a plurality of synthetic beads, each of the synthetic beads having a core containing a magnetic material responsive to the magnetic field, the apparatus further comprising:
a magnetic source located in relationship to the separation compartment configured to generate the magnetic field so as to direct the loaded media to the first output.

22. The mineral processor according to claim 20, wherein the static force comprises a gravitational force and the polymer-coated media comprise a plurality of synthetic beads, each of the synthetic beads having a bead density greater than a density of the slurry so as to allow the loaded media to sink in the separation compartment and to move toward the first output.

23. The mineral processor according to claim 19, wherein the loading compartment comprises an input to receive the polymer-coated media and the slurry, the slurry configured to form a flow from the input of the loading compartment to the separation compartment, the apparatus further comprising:
venturis or an orifice plate located in the loading compartment configured to disturb the flow in the loading compartment so as to enhance loading of the polymer-coated media with the mineral particles.

24. The mineral processor according to claim 19, wherein the stripping stage is arranged to form a first loop with the loading compartment, and to form a second loop with the filtering stage.

25. The mineral processor according to claim 24, wherein the stripping stage configured to provide the first portion containing the polymer-coated media to the loading compartment and to receive the loaded media via the first loop; and to provide the second portion to the filtering stage and to receive the stripping solution from the filtering stage via the second loop.

* * * * *